(12) United States Patent
Raanan et al.

(10) Patent No.: US 8,782,053 B2
(45) Date of Patent: Jul. 15, 2014

(54) DATA STREAMING FOR INTERACTIVE DECISION-ORIENTED SOFTWARE APPLICATIONS

(75) Inventors: Gavriel Raanan, Beit Shemesh (IL); Lawrence Reisler, Beit Shemesh (IL)

(73) Assignee: Happy Cloud Inc., Cambridge, MA (US)

( * ) Notice: Subject to any disclaimer, the term of this patent is extended or adjusted under 35 U.S.C. 154(b) by 0 days.

(21) Appl. No.: 13/412,765

(22) Filed: Mar. 6, 2012

(65) Prior Publication Data

US 2013/0066877 A1 Mar. 14, 2013

Related U.S. Application Data

(60) Provisional application No. 61/449,675, filed on Mar. 6, 2011.

(51) Int. Cl.
*G06F 7/00* (2006.01)
*G06F 17/30* (2006.01)

(52) U.S. Cl.
USPC .......................................................... 707/741

(58) Field of Classification Search
USPC .................................. 707/736, 741, 743, 752
See application file for complete search history.

(56) References Cited

U.S. PATENT DOCUMENTS

| | | | |
|---|---|---|---|
| 5,325,508 A | 6/1994 | Parks et al. | |
| 7,197,570 B2 * | 3/2007 | Eylon et al. | 709/231 |
| 2007/0038749 A1 * | 2/2007 | Noya et al. | 709/226 |
| 2008/0046929 A1 * | 2/2008 | Cho et al. | 725/46 |
| 2008/0082812 A1 * | 4/2008 | Kirshenbaum et al. | 713/2 |
| 2010/0069155 A1 * | 3/2010 | Schwartz et al. | 463/42 |
| 2010/0125565 A1 * | 5/2010 | Burger et al. | 707/713 |
| 2010/0146569 A1 | 6/2010 | Janardhan et al. | |
| 2010/0268842 A1 * | 10/2010 | Kim et al. | 709/231 |
| 2010/0333085 A1 * | 12/2010 | Criddle et al. | 717/178 |
| 2011/0151971 A1 * | 6/2011 | Altshuler et al. | 463/30 |
| 2011/0225576 A1 * | 9/2011 | Guedalia et al. | 717/175 |

* cited by examiner

*Primary Examiner* — Robert Beausoliel, Jr.
*Assistant Examiner* — Nicholas Allen
(74) *Attorney, Agent, or Firm* — Daniel J. Swirsky; AlphaPatent Associates Ltd.

(57) ABSTRACT

Providing data to a computer software application by intercepting a request made by a computer software application to retrieve a first data set from a first data storage location, accessing a record, defined in advance of the request, that includes a reference to the first data set and a reference to a second data set, retrieving the first data set from a data storage location other than the first data storage location, and retrieving the second data set from a data storage location other than the first data storage location in advance of a request by the computer software application to access the second data set at the first data storage location.

8 Claims, 17 Drawing Sheets

DATA STREAMING FOR INTERACTIVE DECISION-ORIENTED SOFTWARE APPLICATIONS

CROSS-REFERENCE TO RELATED APPLICATIONS

This application claims priority benefit from U.S. Provisional Patent Application No. 61/449,675, filed Mar. 6, 2011, the disclosure of which is incorporated herein by reference in its entirety.

FIELD OF THE INVENTION

The present invention relates to data streaming in general, and more particularly to data streaming for interactive, decision-oriented software applications.

BACKGROUND OF THE INVENTION

Current data streaming methods enable a computer user to view or listen to a portion of video or music data file while downloading subsequent portions of file. However, existing streaming methods cannot be used to download, or otherwise install an interactive software application, such as a computer game, where the entire application must be downloaded to the user's computer before the game can be played.

SUMMARY OF THE INVENTION

In accordance with one aspect of the invention a method is provided for recording the inclusion frequency of an element over a plurality of sets, the method including a) maintaining one or more maps of one or more spaces, where each of the maps includes one or more items that uniquely span each of the spaces, b) obtaining a target element from an input set, c) identifying one of the maps of one of the spaces, where the target element is associated with the space, d) mapping the target element onto one of the items in the identified map, e) incrementing a count that is associated with the mapped item, f) storing a set identifier in association with the mapped item, where the identifier identifies the input set that includes the mapped target element, and repeating steps b)-f) for a plurality of elements in a plurality (N) of input sets, where each of the elements is mapped only once.

In accordance with another aspect of the invention the method further includes adding the target element to an output set if the count associated with the mapped item is equal to one, where the output set is associated with the identifier stored in association with the mapped item, and where the output set includes only elements that are unique to the input set identified by the identifier.

In accordance with another aspect of the invention the method further includes adding the target element to an output set if the count associated with the mapped item is equal to N, where the output set includes only elements that are included in each of the plurality of input sets.

In accordance with another aspect of the invention the element corresponds to a sequence of features in one of the spaces and where the element includes a space identifier, a first feature, and a size.

In accordance with another aspect of the invention each of the plurality of items that uniquely span the space include a first feature, a size, a count, and a set identifier.

In accordance with another aspect of the invention the mapping step further includes mapping onto the item where the item spans the first feature of the target element.

In accordance with another aspect of the invention the incrementing of the count step is performed if the first feature and the size of the target element are equivalent to the first feature and the size of the mapped item, respectively.

In accordance with another aspect of the invention the method further includes splitting the mapped item into multiple split items if the first feature of the mapped item differs from the first feature of the target element and/or if the size of the mapped item differs from the size of the target element, maintaining an association between an attribute and the mapped item with any of the split mapped items, adjusting the first feature and size attributes of the multiple split items, where either the first feature of one of the split mapped items is equivalent to the first feature of the target element, and/or where the size of one of the split mapped items is equivalent to the size of the target element, and adding the multiple split mapped items and the associated attributes to the map.

In accordance with another aspect of the invention the method further includes splitting the target element into multiple target elements if the first feature of the target element differs from the first feature of the target item and/or the size of the target element differs from the size of the item element, maintaining an association between an attribute and the target element with any of the split target elements, and adjusting the first feature and size attributes of the multiple split target elements, where either the first feature of one of the split target elements is equivalent to the first feature of the mapped item, and/or where the size of one of the split target elements is equivalent to the size of the mapped item.

In accordance with another aspect of the invention a method is provided for defining blocks, the method including a) executing a decision-oriented application, b) adding a begin label indicating a beginning of a block to an output file, c) obtaining a request for data by the application, d) comparing the request with one or more requests that are included in an index file, e) adding the request to the output file if the request is not included in the index file or if the request is both included in the index file and if an attribute indicates that the request is hidden in the index file, f) repeating steps c) through e), g) adding an end label indicating an end of the block in the output file, h) adding the requests included between the begin label and the end label in the output file to the index file in association with the block, i) indicating that the added requests are hidden if the obtaining of the request is subsequent to a decision branch in an execution flow of the application, repeating steps c) through i).

In accordance with another aspect of the invention a method is provided for evaluating a candidate index file, the method including a) installing an application at a local storage device, b) executing the installed application, c) obtaining a target request for data, d) storing information that is associated with the obtained target request in a simulation file, e) obtaining information that is associated with a previously obtained request from the simulation file, f) calculating a delay between responding to the previously obtained request and obtaining the target request as a function of the obtained information that is associated with the previously obtained request, g) notifying the application that the requested data is available, h) storing the calculated delay in the simulation file in association with the previously obtained request, and repeating steps c) through h).

In accordance with another aspect of the invention the stored information includes a filename, a start address, a size of the request, and a time of obtaining the request.

In accordance with another aspect of the invention the storing step includes storing a time for completing a processing of the obtained request in the simulation file.

In accordance with another aspect of the invention the method further includes a) installing a set of core files of an application, b) storing a set of data files of an application at a remote storage device, c) obtaining a request for data from the simulation file, where obtaining the request further includes obtaining the delay that is associated with the request, d) factoring the delay that is associated with the obtained request as a processing delay, e) retrieving the requested data from the remote storage device in accordance with a candidate index file, f) measuring a data retrieval delay that is associated with retrieving the requested data from the remote storage device, repeating steps c) through f), and determining a total delay in association with the candidate index file, where the total delay is determined as a function of the processing delays and the data retrieval delays.

In accordance with another aspect of the invention the retrieving the requested data step further includes activating a rule that is stored in the candidate index file in association with the obtained request.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1A:
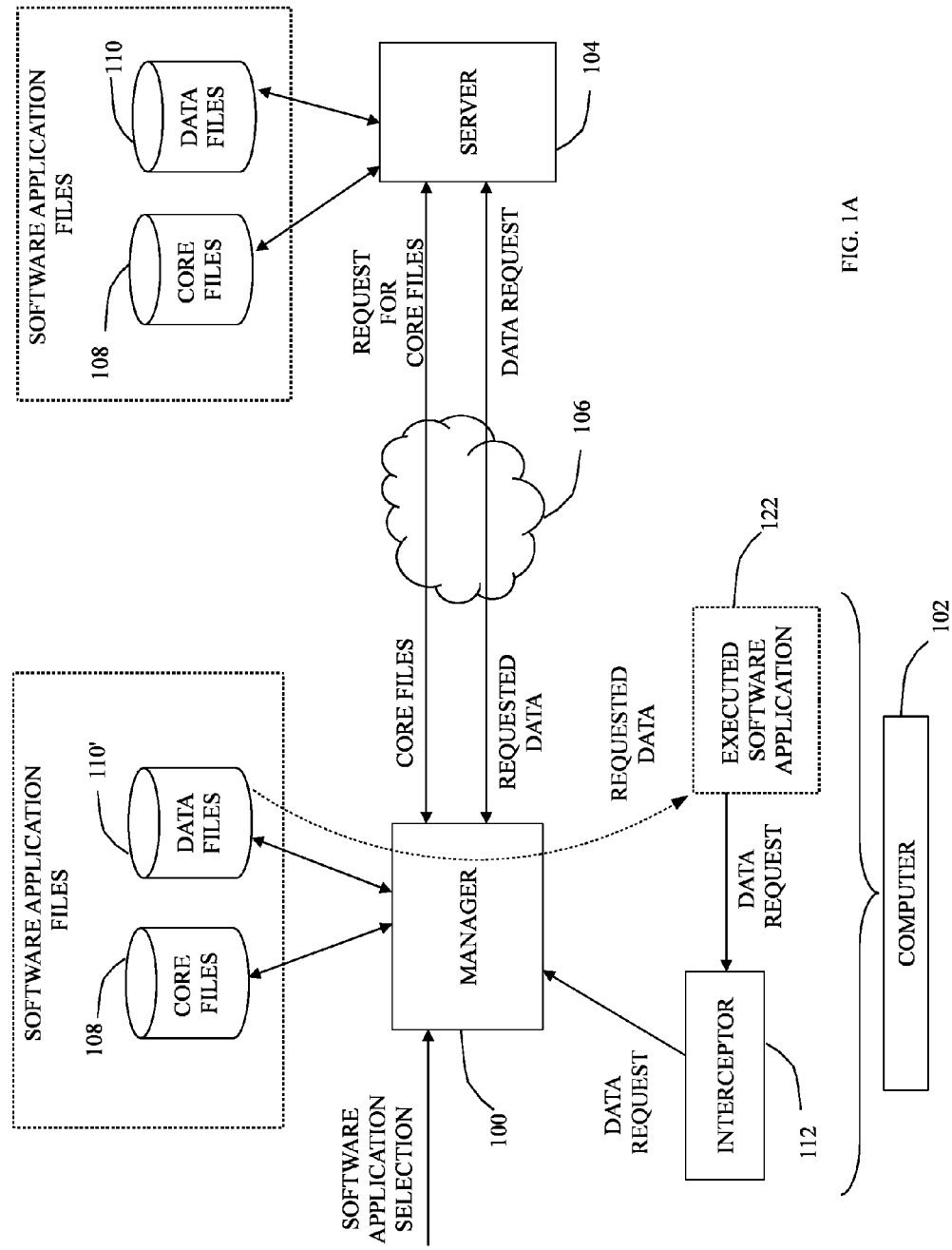
FIG. 1A is a simplified conceptual illustration of a system for managing the execution of a software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1A, which is a simplified conceptual illustration of a system for managing the execution of a software application, constructed and operative in accordance with an embodiment of the invention. In the system of FIG. 1A, a computer 102 is configured with a manager 100 that enables a user of computer 102 to indicate to manager 100, using any known technique, a software application, such as a computer-based game, for execution by computer 102. Manager 100 preferably determines if the software application is ready to be executed on computer 102, such as where manager 100 previously installed the software application for execution by computer 102 as described in greater detail hereinbelow, and executes the application if it is ready to be executed. If the software application is not ready to be executed by computer 102, manager 100 preferably retrieves a predefined portion of the software application, such as from local data storage media, and/or by downloading the predefined portion of the software application from a server 104, such as via a communications network 106, such as the Internet. As is described in greater detail hereinbelow, the predefined portion of the software application is preferably in the form of one or more computer files in a set of core files 108, where the software application is made up of core files 108 and a set of data files 110 that is stored on a data storage device, such as on server 104, or alternatively on a Digital Versatile Disk (DVD). Manager 100 then installs the software application for execution by computer 102, preferably by creating on a local data storage device that is accessible to computer 102 a predefined directory structure that is required by the software application and placing the files of core files 108 into predefined locations within the directory structure. Manager 100 also preferably creates a set of placeholder files 110' within the directory structure, such as by using Sparse-Files™ API for Microsoft Windows™, where each placeholder file in set 110' corresponds to a file in data files 110. The directory structure, file locations within the directory structure, and the names and sizes of the files in data files 110 are preferably known in advance to manager 100 or are otherwise acquired by manager 100 using conventional techniques, such as from local data storage media and/or from server 104. Once installed, manager 100 preferably initiates the execution of the software application by computer 102, such as by executing one of core files 108 that is predefined to cause the execution of the software application, thereby creating an instance of an executed software application 122.

Computer 102 also preferably includes an interceptor 112 that is configured to intercept requests made by executed software application 122 to retrieve data from placeholder files 110', preferably where interceptor 112 prevents the operating system of computer 102 from processing the request, such as by withholding the request from the operating system. Interceptor 112 then forwards the request to manager 100. When manager 100 receives a request for data from interceptor 112, manager 100 determines whether the requested data are present within placeholder files 110'. If the requested data are present within placeholder files 110', manager 100 allows executed software application 122 to retrieve the requested data from placeholder files 110', preferably by allowing the operating system of computer 102 to process the request, such as by forwarding the request to the operating system or instructing interceptor 112 to forward the request to the operating system. If the requested data are not present within placeholder files 110', manager 100 retrieves the requested data from their location(s) within data files 110, and places the retrieved data into their corresponding location(s) within placeholder files 110'. Manager 100 then allows executed software application 122 to retrieve the requested data from placeholder files 110', such as is described above. Manager 100 may also retrieve other data from data files 110 in advance of requests by executed software application 122 to retrieve such data, as is described hereinbelow in greater detail.

Figure 1B:
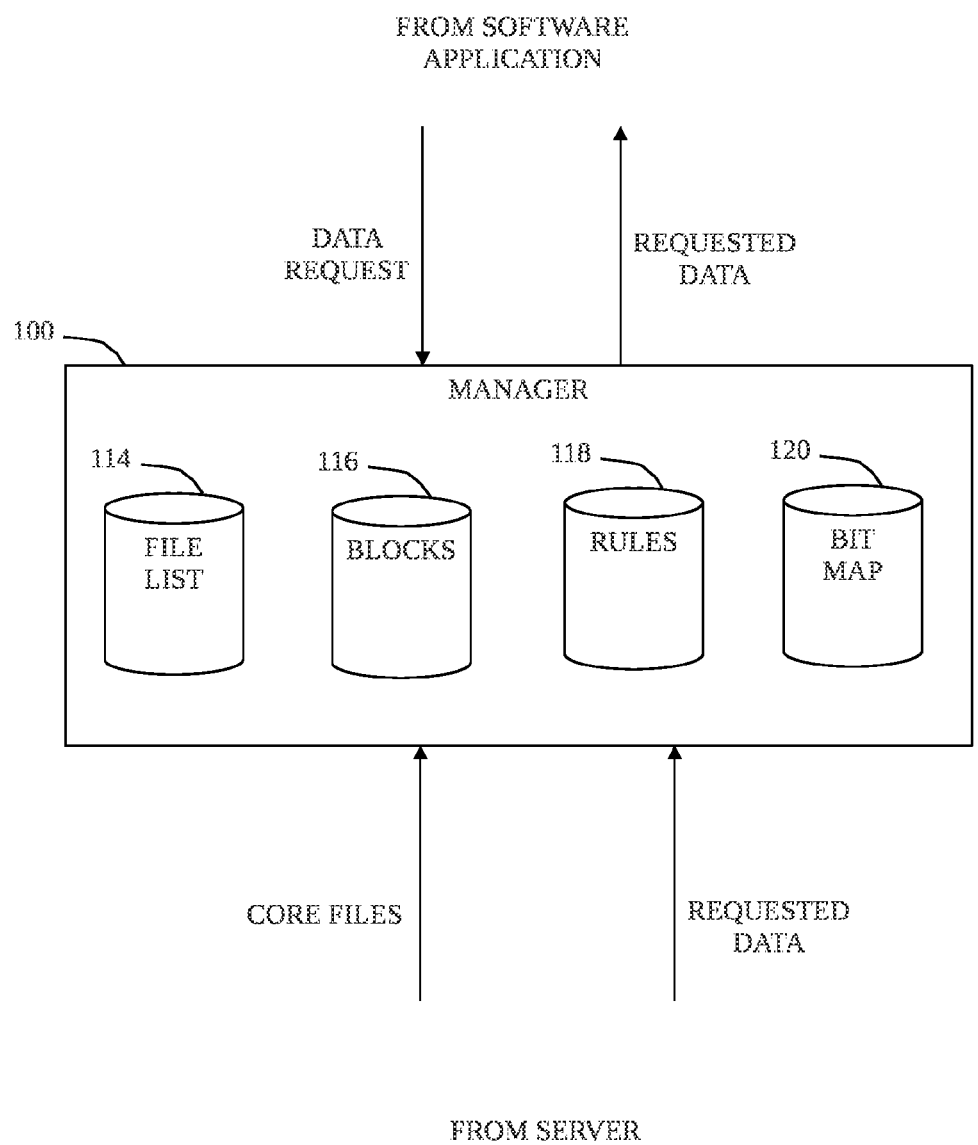
FIG. 1B is a simplified conceptual illustration of an implementation of manager 100 of FIG. 1A, constructed and operative in accordance with an embodiment of the invention.

Reference is now made to FIG. 1B, which is a simplified conceptual illustration of an implementation of manager 100 of FIG. 1A, constructed and operative in accordance with an embodiment of the invention. In the system of FIG. 1B, manager 100 preferably includes a file list 114 of the computer files that make up a software application that is managed by manager 100 as described herein, where file list 114 preferably indicates whether a file is one of core files 108 or one of data files 110. Manager 100 also preferably includes a set of block definitions 116 having multiple named records referred to as "blocks," where each block includes one or more references to data within data files 110. Manager 100 also preferably includes a set of rules 118, where each rule is associated with a block and determines if and how data that are referred to in the block, or in one or more other blocks, are to be downloaded from data files 110, whereupon the data that are retrieved from data files 110 are placed by manager 100 in placeholder files 110'. Manager 100 also preferably maintains a record of the data that have been retrieved and placed in placeholder files 110', such as by maintaining a bitmap 120 indicating locations within placeholder files 110' to which retrieved data were written. Any of the file, block, and rule data described hereinabove are preferably known in advance to manager 100 or are otherwise acquired by manager 100 using conventional techniques, such as from local data storage media and/or from server 104.

Figure 2A:
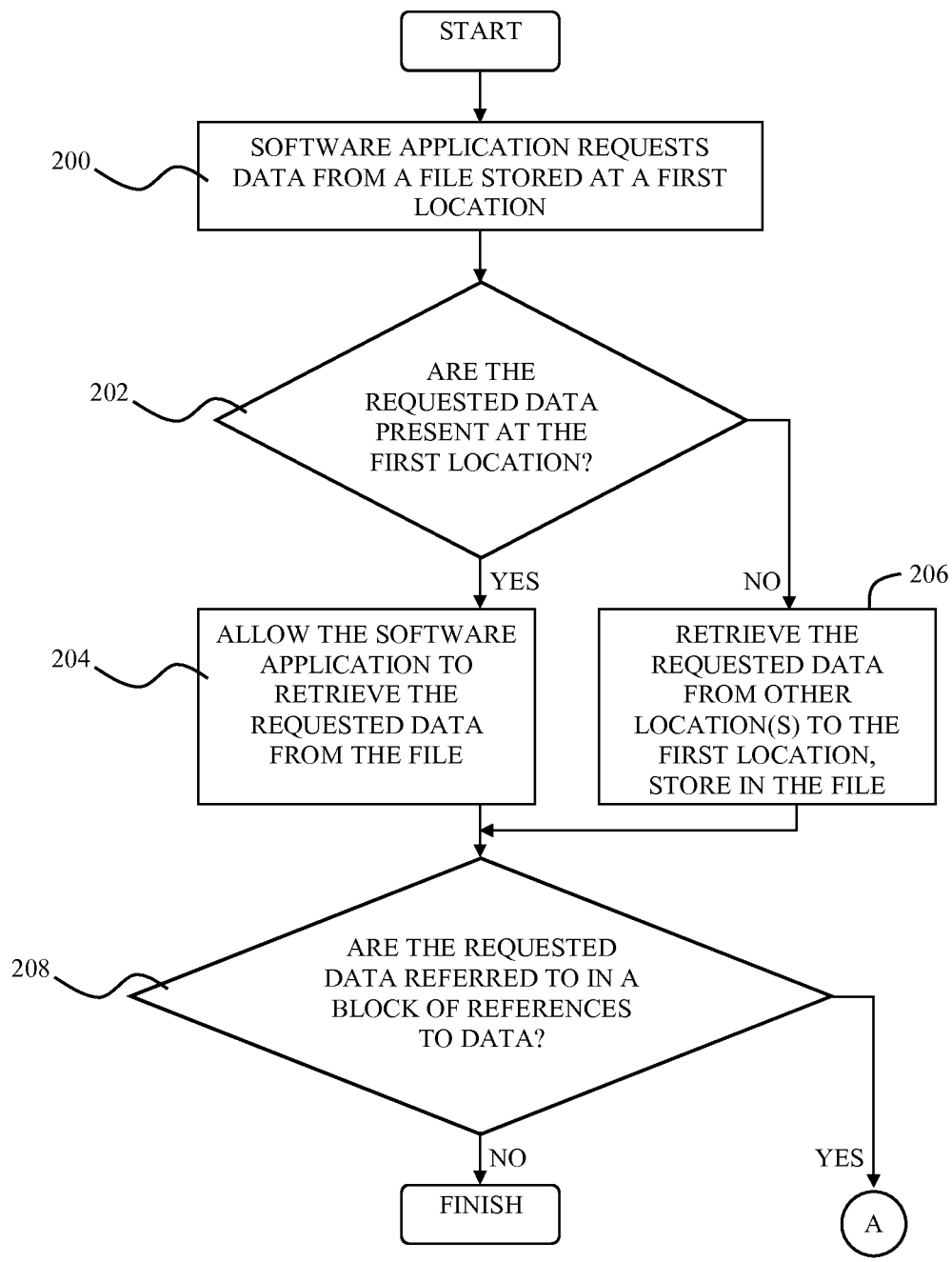
FIGS. 2A and 2B, taken together, is a simplified flowchart illustration of an exemplary method of operation of the system of FIGS. 1A and 1B, operative in accordance with an embodiment of the invention.
Figure 2B:
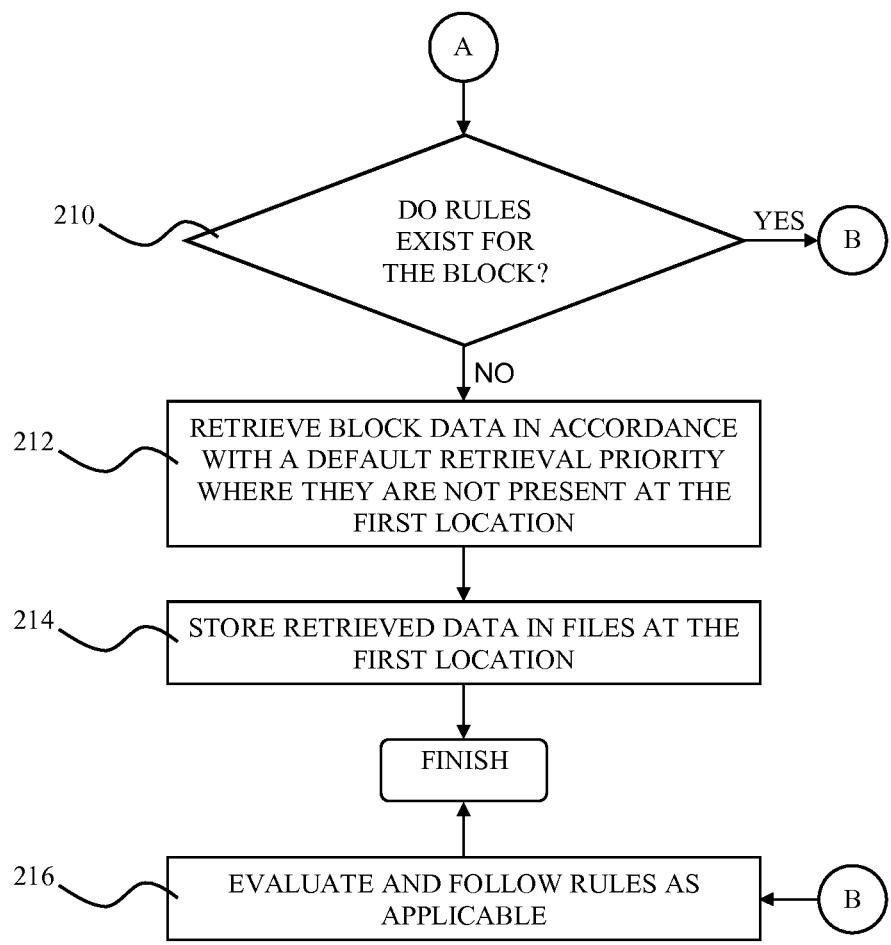

Reference is now made to FIGS. 2A and 2B, which, taken together, is a simplified flowchart illustration of an exemplary method of operation of the system of FIGS. 1A and 1B, operative in accordance with an embodiment of the invention. In the method of FIGS. 2A and 2B, a request made by a software application during its execution by a computer is received or is otherwise detected, where the request is to retrieve data from a file stored at a first location (step 200), preferably on a data storage device that is locally accessible to the computer. The name of the file, and typically the location of the requested data within the file, are specified as part of the request. If the requested data are present in the file (step 202), the software application is allowed to retrieve the requested data from the file, or the data are otherwise provided to the software application (step 204). If the requested data are not present in the file, the requested data are retrieved from one or more locations other than the first location, such as from a remote server where a copy of the requested data is stored and that is accessible via a communications network, and places the retrieved data into their corresponding location(s) within the file stored at the first location (step 206), whereupon the software application is allowed to retrieve the requested data from the file, or the data are otherwise provided to the software application (step 204).

If the requested data are referred to in a predefined block that includes one or more references to data that are associated with the software application (step 208), and if the block has no predefined rules associated with it (step 210), then the data referred to in the block are preferably retrieved in accordance with a default retrieval priority where they are not present at the first location (step 212), such as by retrieving the data from the remote server. The retrieved data are then stored in predefined locations within corresponding files stored at the first location (step 214). If the block has one or more predefined rules associated with it, then the rules are evaluated and followed where applicable (step 216), such as where the rules indicate that data referred to in the block, and/or in one or more other blocks, are to be retrieved, and at what retrieval priority. A description of examples of such rules and their application now follows.

Where the data referred to in a block are to be retrieved as described hereinabove, the block may be logically placed in a priority queue together with an indicator of a retrieval priority, such as an integer between 1 and 9, where 1 indicates the highest level of retrieval priority. Data referred to in higher priority blocks in the priority queue are preferably retrieved before data referred to in lower priority blocks unless otherwise indicated by a rule. Data referred to in multiple blocks with equal priority are preferably retrieved in a round-robin fashion. Rules associated with a block may affect the priority queue as follows:

by adding any block including itself to the priority queue with an integer priority level;

by modifying the priority of a block already in the queue by a certain positive or negative offset;

by removing blocks from the priority queue based on full or partial block name matches (wildcards), or based on priority level (greater than, less than, or equal to a threshold value);

by setting a buffering threshold for a block, such that if a predefined amount of data referred to in the block has been retrieved and is and ready for use by the software application, the priority queue will temporarily stop retrieving data referred to in the block and allow data to be retrieved for other blocks in the priority queue, even if they have a lower retrieval priority, until a predefined amount of the retrieved data referred to in the block has been provided to the software application, whereupon data retrieval for the block may resume.

Other types of rules associated with a block may include rules that:

cause a progress bar to appear during data retrieval, where the progress bar tracks the progress of the retrieval of data referred to by one or more specified blocks;

when a request is received from the software application for data that are referred to in a block, and the data are already present, withholds the data from the software application until the data referred to by one or more specified blocks have been completely retrieved.

Figure 3A:
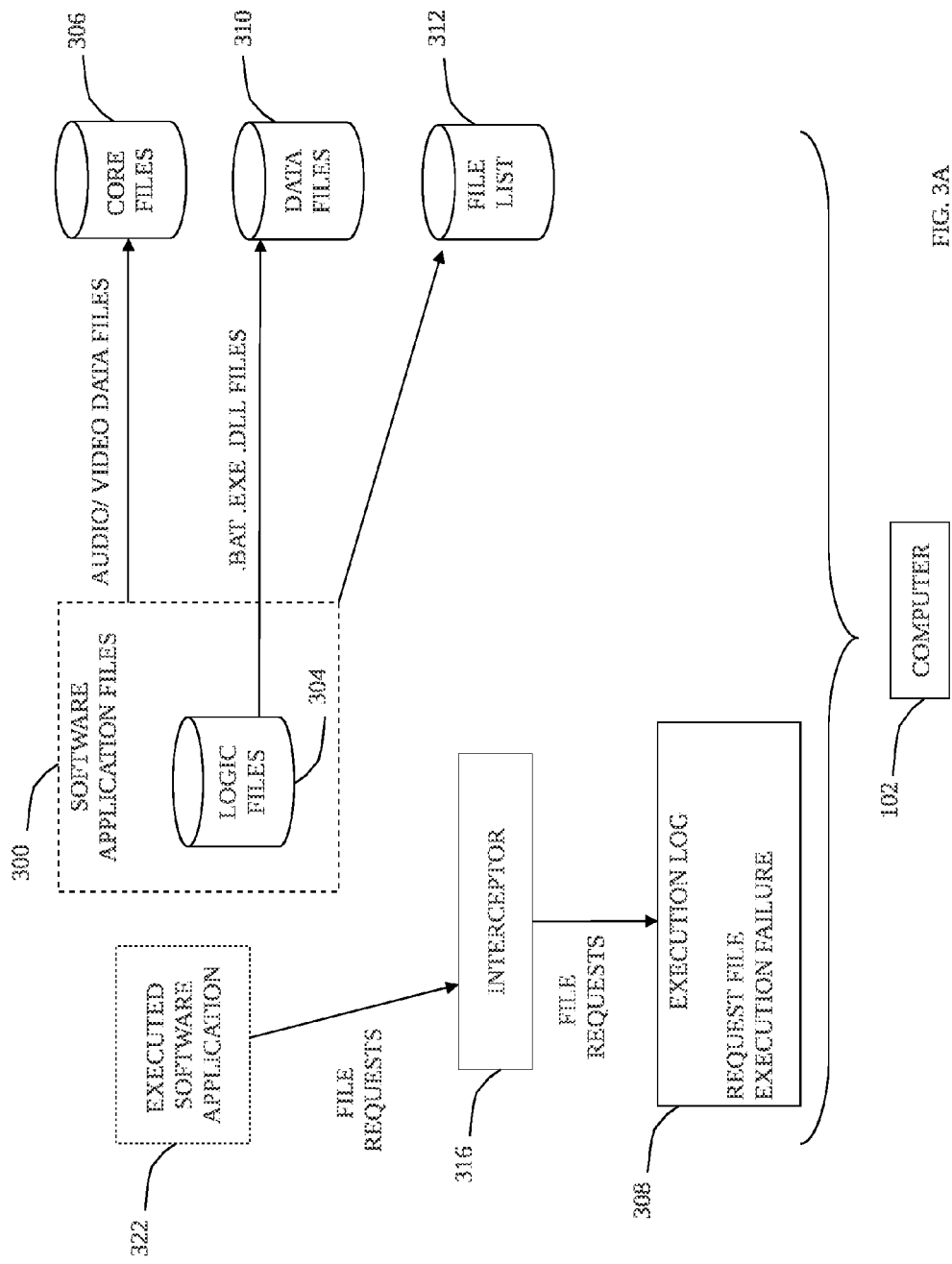
FIGS. 3A and 3B, taken together, provide a simplified conceptual illustration of a system for preparing a software application for execution by a computer, constructed and operative in accordance with an embodiment of the invention.
Figure 3B:
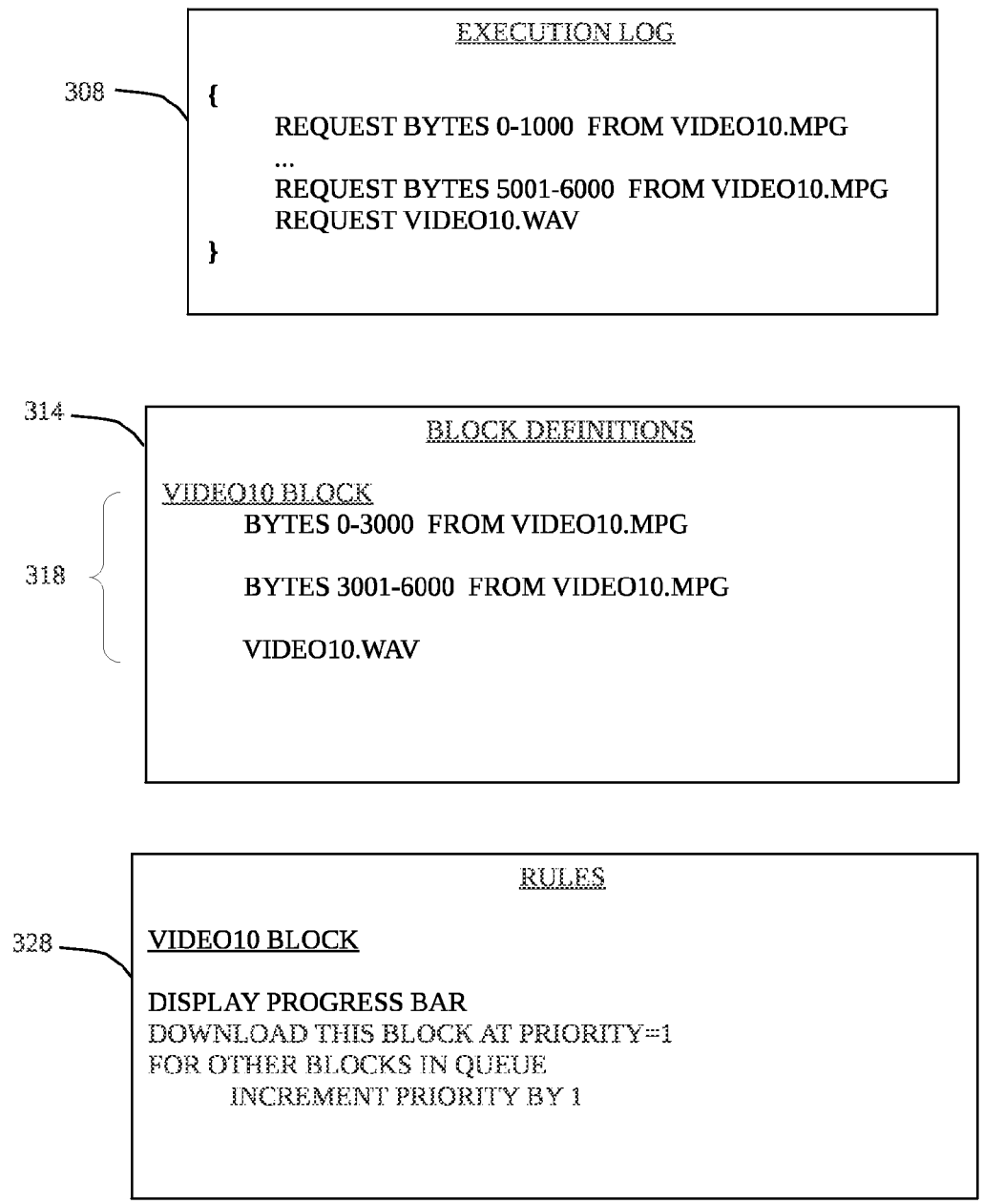

Reference is now made to FIGS. 3A and 3B, which, taken together, provide a simplified conceptual illustration of a system for preparing a software application for execution by a computer, constructed and operative in accordance with an embodiment of the invention. The system of FIGS. 3A and 3B may be used to prepare a software application for execution as described hereinabove. In FIG. 3A, a software application 300, such as a computer-based game, is preferably installed on a computer 302 using conventional methods. Application 300 preferably includes one or more files that provide processing logic for application 300 that are added to a set of core files 306, such as files with names that include suffixes such as '.exe', '.dll', or '.bat'. Application 300 also preferably includes one or more data files 310, which may include files such as audio files, video files, and any other files not in core files 306 that are used by application 300 when it is executed. The execution of application 300 is preferably initiated at computer 302, such as by executing one of core files 306 that is predefined to cause the execution of the application 300, thereby creating an instance of an executed software application 322. An execution log 308 is created in accordance with conventional techniques to record requests made by executed software application 322 for data from any of the files in data files 310, such as by configuring an interceptor 316 to intercept the requests and record the requests in log 308. If the execution fails, such as due to a request by executed software application 322 for a file in application 300 that was not included in core files 306, the file is preferably added to core files 306. This process is preferably repeated until core files 306 includes files of application 300 that, when executed, do not cause execution to fail, such as when their execution reaches a steady state, such as waiting for user input or requesting and waiting for data from data files 310. Data files 310 will typically include any other files that are used by application 300 when it is executed and that are not included in core files 306. A file list 312 of the files included in core files 306 and in data files 310 is preferably maintained.

As shown in FIG. 3B, block definitions set 314 is defined that includes one or more blocks of references to the requested data in data files 310. The blocks are preferably defined in a manner that groups logically related data, such as data that are requested from one or more files in data files 310 at a given point during the execution of application 300, or data that are requested sequentially from multiple files in data files 310 during a given execution interval of application 300. A block may be defined by a human operator by marking portions of log 308. For example, the operator may place a '{' in log file 308 before the first request for data from a video file named "video10.mpg", and a '}' after the last request for data from the video file. References to the requested data that appear between the '{' and '}' markers in log 308 may then be used to define a block 318. Additional optimizing techniques may be applied when defining a block, such as by dividing block 318 into two smaller blocks, one that includes references to audio data portions of "video10.mpg", and one that includes references to video data portions of "video10.mpg". Since the video data portions of a multimedia file are typically much larger than the audio data portions, the block that includes references to video data portions of "video10.mpg" may be further divided into two or more blocks. A set of rules 328 is shown, in which rules may be associated with specific blocks and defined for controlling block-related behavior as described hereinabove.

Figure 4:
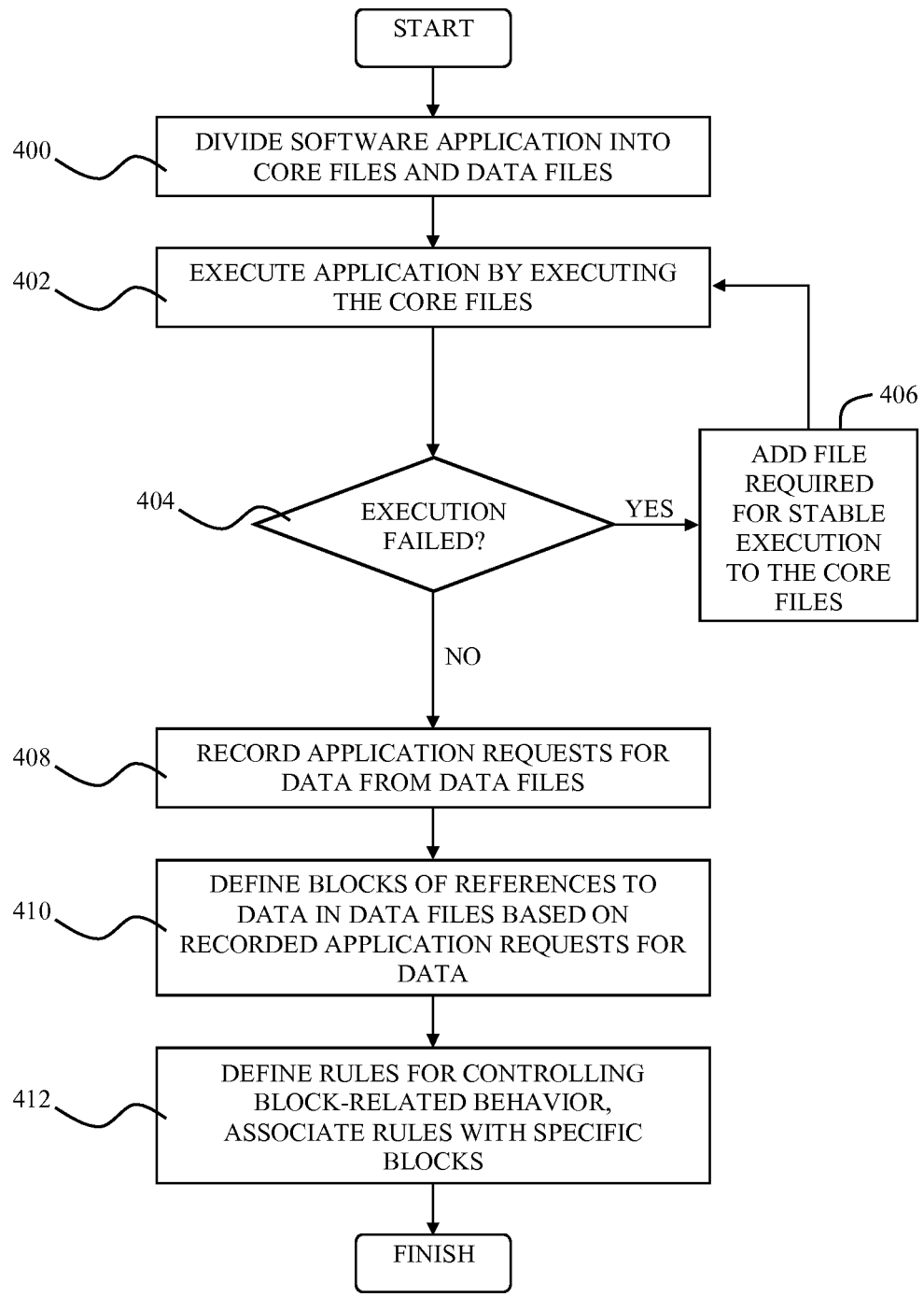
FIG. 4 is a simplified flowchart illustration of an exemplary method of operation of the system of FIGS. 3A and 3B, operative in accordance with an embodiment of the invention.

Reference is now made to FIG. 4, which is a simplified flowchart illustration of an exemplary method of operation of the system of FIGS. 3A and 3B, operative in accordance with an embodiment of the invention. In the method of FIG. 4, a software application is divided into core files and data files (step 400). The application is executed by executing the core files (step 402). If the execution fails (step 404) due to the absence of a file from the core files, the file is removed from the data files and added to core files (step 406). This process is preferably repeated until the core files includes those application files that, when executed, do not cause execution to fail, such as when their execution reaches a steady state, such as waiting for user input or requesting and waiting for data from the data files. Requests made by the application for data from any of the data files are recorded (step 408). One or more blocks are defined, where a block includes one or more references to data in the data files that are requested by the application (step 410). Rules are defined for controlling block-related behavior and are associated with specific blocks (step 412).

The system of FIGS. 3A and 3B and the method of FIG. 4 may be modified to optimize data retrieval efficiency from the server, such as by packaging together multiple data segments that may be referred to within the same block but may not necessarily reside in physically adjacent locations within the same data file. Data may also be stored in a compressed manner on the server. Multiple versions of audio and video files may be stored on the server, where each version of the same file is of a different quality, such that a smaller, lower-quality version of a file may be provided initially by the server, with a larger, higher-quality version being provided later.

Figure 5:
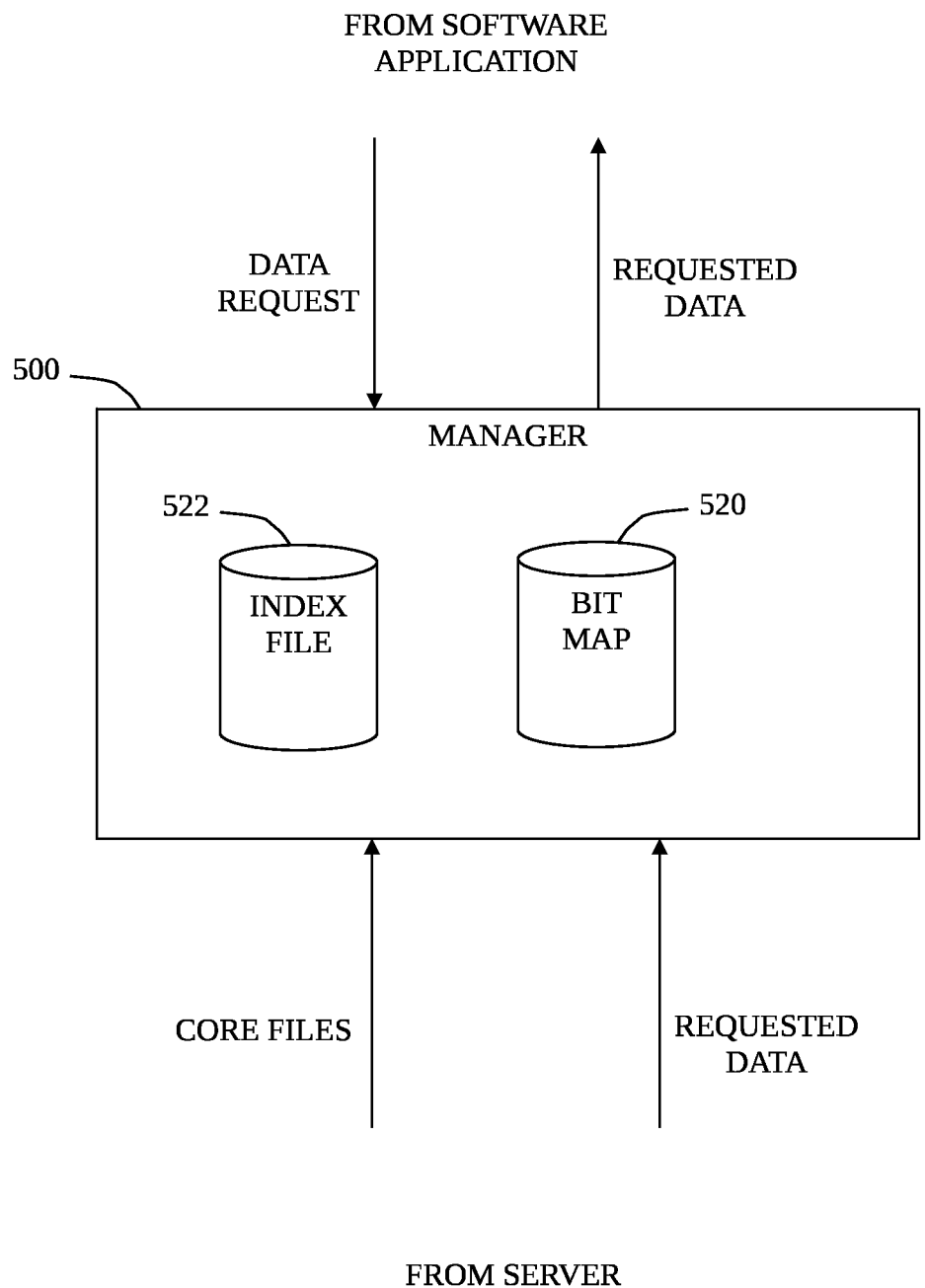
FIG. 5 is another simplified conceptual illustration of an implementation of manager 100 of FIG. 1A, constructed and operative in accordance with an embodiment of the invention.

Reference is now made to FIG. 5 which is a simplified conceptual illustration of a system for preparing a software application for execution by a computer, constructed and operative in accordance with an embodiment of the invention. The system of FIG. 5 is substantially similar to that of FIG. 1B with the notable difference that file list 114, block definitions 116, and associated rules 118 are included in an index file 522. Upon obtaining a request for data, manager 500 determines if and how to download or otherwise retrieve the requested data in accordance with the block and rule definitions included in index file 522 and with a bitmap 520 that indicates what data have already been retrieved, in a manner similar to the method described in FIG. 1B. Additionally, index file 522 preferably includes information required for installing the application, such as the directory for storing downloaded portions of the application, and a remote address for retrieving application files, and any other information that is relevant to installing and/or downloading the application.

Figure 6A:
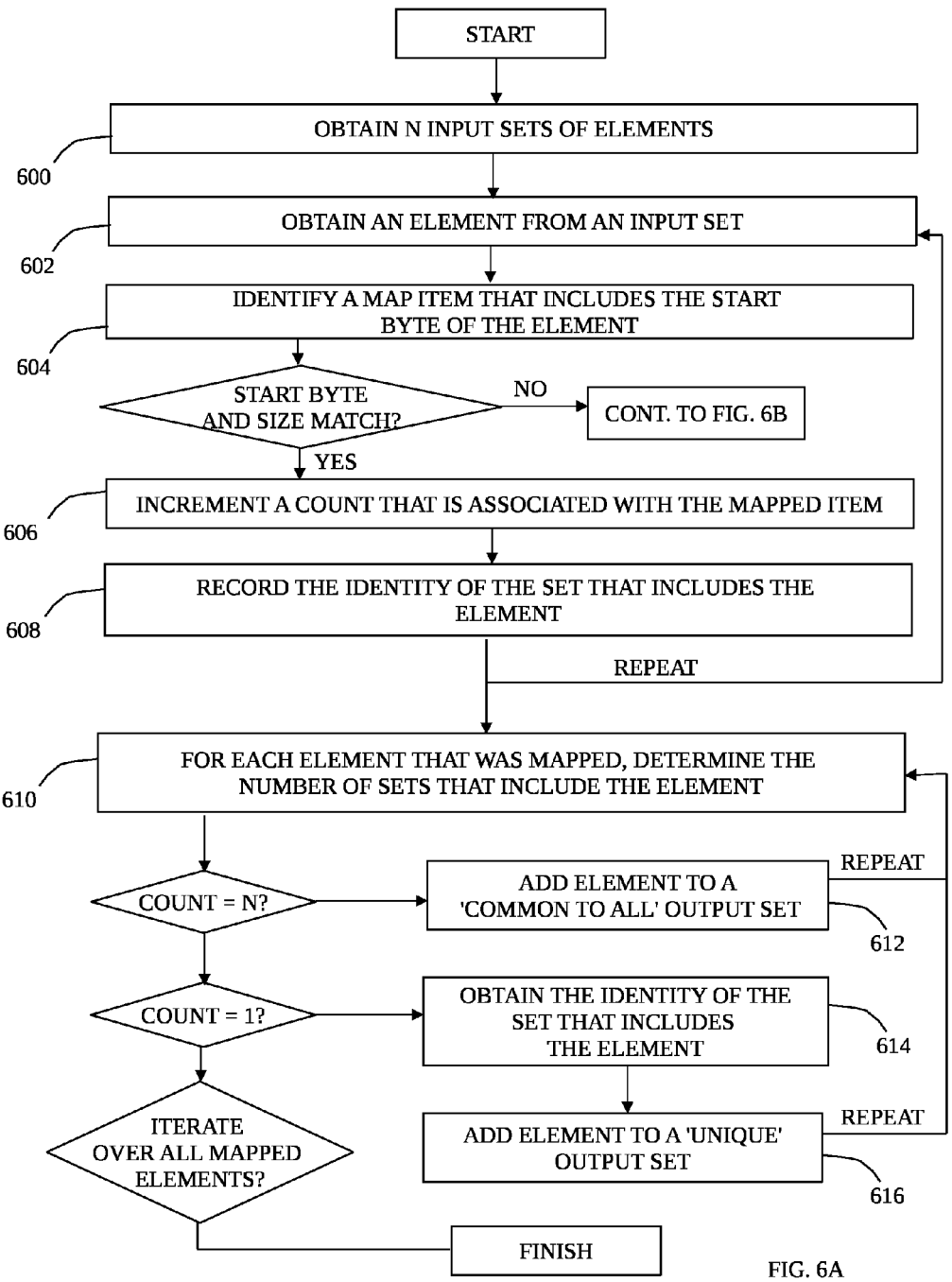
FIG. 6A is a simplified flowchart illustration of an exemplary method of operation of the system of FIG. 5, operative in accordance with an embodiment of the invention.

Reference is now made to FIG. 6A which is a simplified flowchart illustration of an exemplary method of operation of the system of FIG. 5, operative in accordance with an embodiment of the invention. The method of FIG. 6A relates to transforming multiple (N) input sets of elements to at most N+1 output sets, where each output sets includes only unique elements, and where one output set preferably includes elements that are common to all of the N input sets, and the remaining output sets each correspond to one of the N input sets and preferably only include elements that are unique to the corresponding input set. A map is preferably maintained for recording how many times an element is included in all the input sets. For example, a file map is maintained for each data file that is referenced by the blocks defined in the index file, where one or more items in the file map are preferably defined as a start byte, size, and a frequency count, and that uniquely span the file map. Requests for data, or elements, are preferably defined as a file name, start byte and size, and thus every element is associated with a file map according to the file name. The elements and maps are preferably defined in a manner that guarantees that every element maps onto one and only one item in the file map. The file map is preferably initialized with a single item defined with a start byte of zero, a size equal to the file size, and a count of zero.

Thus, in the method of FIG. 6A multiple (N) sets, or blocks, that preferably include one or more elements, such as one or more requests for data that include a name of a data file where the requested data are stored, a start address in the file for the requested data, and a size of the data request, are obtained (Step 600). An element of a set is preferably obtained (Step 602) and the element is preferably mapped to an item in the file map, such as by identifying an item in the file map that includes the start byte of the element, and where there is preferably only one such mappable item in the file map (Step 604). If the element corresponds to the item, such as a one-to-one correspondence where the start address and size of the element are equivalent to the start address and size of the corresponding item in the map, then a count that is associated with the mapped element is incremented (Step 606), and the identity of the set that includes the mapped element, such as the block that included the data request, is recorded in association with the element, such as by setting a pointer that is associated with the count to point to the block (Step 608). If the element does not correspond to the item in a one-to-one correspondence, such as if the start bytes and/or sizes of the element and the item do not match, processing may continue with the method described in FIG. 6B. Steps 602-608 are preferably repeated for each element in each set, in a manner to preferably obtain and map each element once and only once. For each element that was mapped in steps 602-608, the number of blocks that include that element is determined, such as by checking the count that is associated with that element (Step 610). If the element is included in each input set, such as if the count associated with the element has value of N, the element is preferably added to an output set that is reserved for elements that are common to all the input sets (Step 612). Otherwise, if the element is found in only one input set, such as if the count has a value of one, the identity of the input set that includes the element and that was recorded in step 608 is obtained (Step 614), and the element is preferably added to an output set corresponding to the input set, and that is reserved for elements that are unique to that input set (Step 616).

Figure 6B:
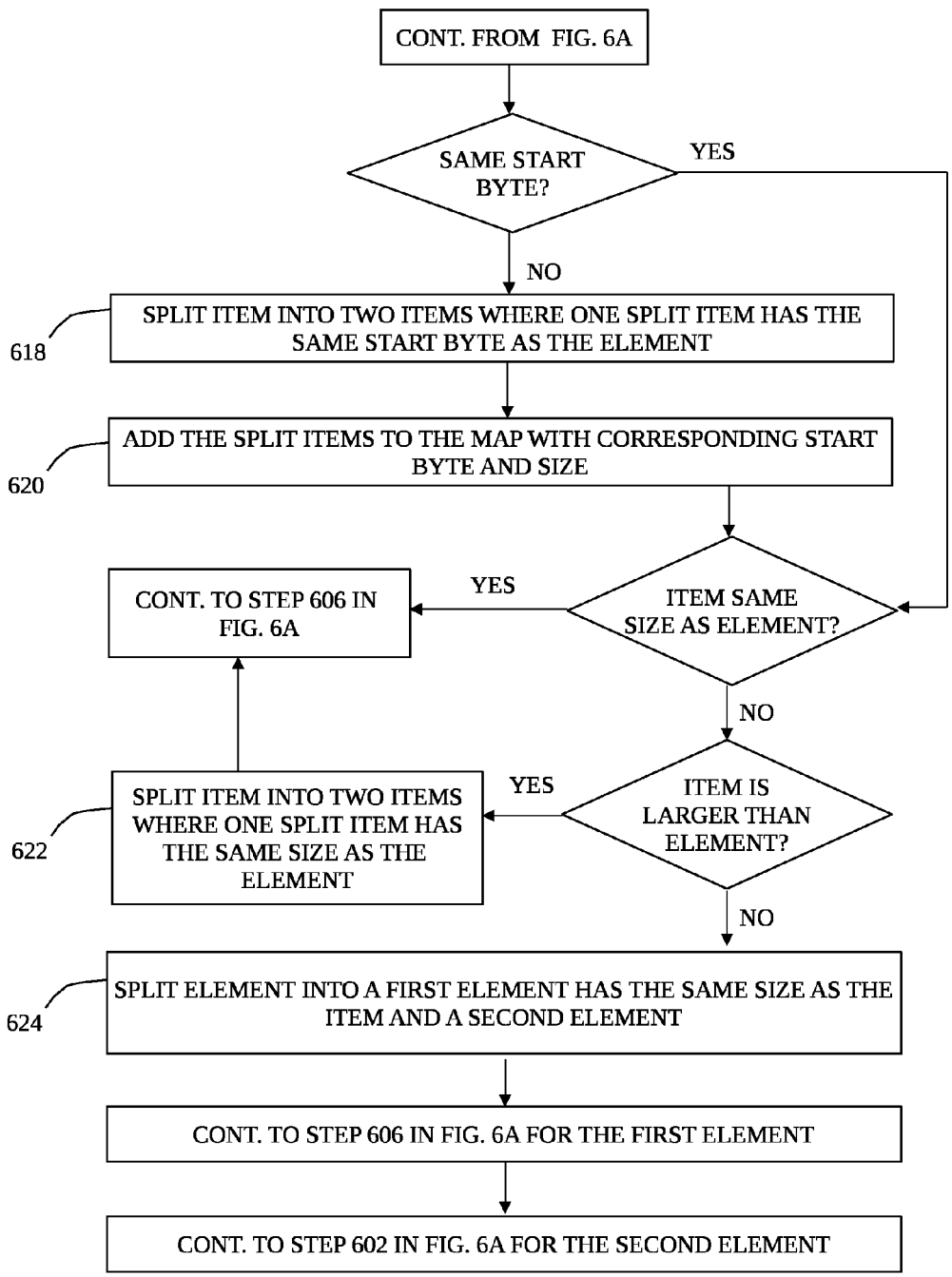
FIG. 6B is a simplified flowchart illustration of an exemplary method of operation of the system of FIG. 5, operative in accordance with an embodiment of the invention.

Reference is now made to FIG. 6B which is a simplified flowchart illustration of an exemplary method of operation of the system of FIG. 5, operative in accordance with an embodiment of the invention. The method of FIG. 6B relates to mapping an element of a set onto an item in a map where either start bytes and/or the sizes of the element and item are not equivalent. The method is described in the context of mapping a request for data onto a map for a data file. However, this is for illustration purposes only, and it may be noted that the method is applicable to a general mapping of elements onto a map of items, where the elements and items do not necessarily comprise discrete features. If the start byte of the map item is not the same as the start byte of the element, the map item is split into two items where one of the split items preferably has the same start byte as the element. For example, a first map item is defined starting from the start byte of the map item until the start byte of the element, and a second map item is defined starting from the start byte of the target element and including the remaining bytes of the target map item (Step 618). Thus, if a target element referencing bytes 100,000 to 150,000 is mapped onto a target map item for bytes 80,000 to 150,000, the target map item is split into a first map item with a start byte of 80,000 and a size of 20,000, spanning bytes 80,000 to 99,999, and a second map item with a start byte of 100,000 and a size of 50,000, spanning bytes 100,000 to 149,999. The first and second map items are preferably added to the map, along with any identifying attributes such as keys that identify the start bytes of the items, and their sizes (Step 620). Upon obtaining a map item with the same start byte as the element, if the map item is larger than the element, the map item is preferably split to produce a third map item whose size corresponds to the size of the element, and a fourth map item including any portion of the map item after the last byte of the element, where the start bytes and sizes of the split items are added to the map, accordingly (Step 622). For example, if the map item references 80,000 bytes starting from byte 80,000 and the element references 50,000 bytes starting from byte 100,000, then the map item is subsequently split into three items: a first item spanning bytes 80,000 to 99,999 with a start byte of 80,000 and size of 20,000, a second item spanning bytes 100,000 to 149,999 with a start byte of 100,000 and a size of 50,000 and corresponding in a one-to-one correspondence with the element, and a third item spanning bytes 150,000 to 159,999, with a start byte of 150,000 and size of 10,000. Conversely, if the element is larger than the map item, the element is split into a first element starting from the first byte of the element until the last byte of the map item and corresponding to the map item, and a second element including any remaining bytes of the target element after the last byte of the map item (Step 624). For example, if an element referencing 50,000 bytes starting from byte 100,000 is mapped onto a map item spanning 30,000 bytes starting from byte 100,000, the element is split into a first element from 100,000 to 129,999 corresponding to the map item, and a second element from 130,000 to 149,999.

Processing preferably continues for the second element at step 604 of FIG. 6A. Upon performing the above splitting steps, if the element and the map item have the same start byte and size, the method preferably resumes from Step 606 in FIG. 6A. It may be noted that the method of FIG. 6B is implemented prior to, in conjunction with, or subsequent to the method of FIG. 6A. It may be noted that any of the splitting steps described in FIG. 6B is preferably implemented in a manner to produce split items that exactly span the original item, and that the items thus span the file and maintain a one-to-one correspondence with the data stored in the file. Furthermore, any attributes associated with an item prior to a split, such as a count or an identifier of a set that includes the element that is mapped to the item, are associated with any items resulting from the split. It may further be noted that prior to performing the method of FIGS. 6A-6B, any redundancies that appear in the block definitions, such as multiple references to the same data range, are preferably resolved using any known method. In addition, multiple elements, such as data segments, that are within a predefined range and/or that are defined consecutively in the set, or block, are preferably joined to form a single element, along with any attributes that are associated with the multiple elements. It may further be noted that the order of the elements in the sets that result from implementing the method of FIGS. 6A-6B is preferably determined in accordance with one or more predefined criteria, and that the resulting sets are maximal in a sense that elements may be removed from any of the sets in. It may further be noted that the above method is applicable to non-integer ranges.

Figure 7A:
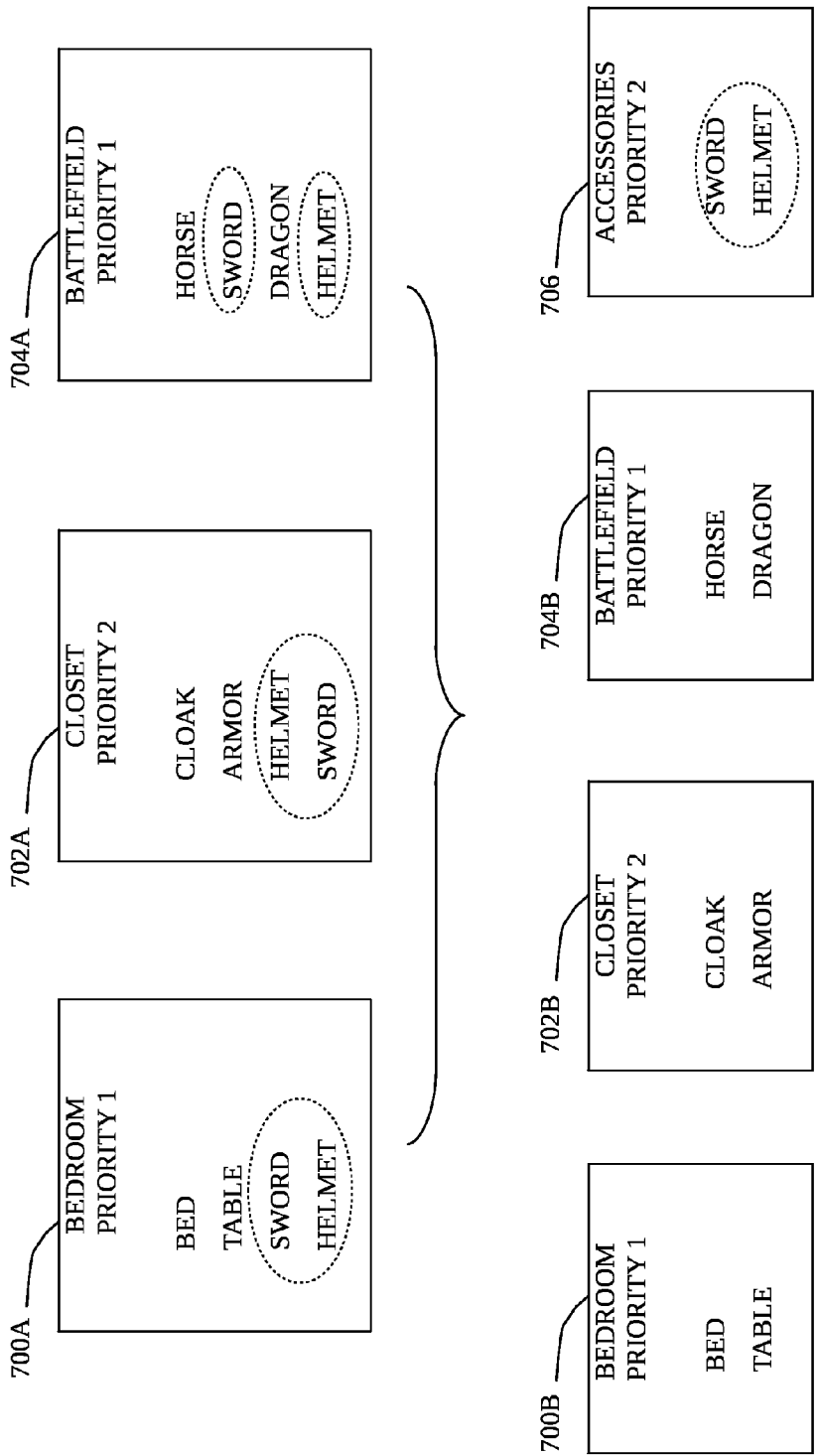
FIGS. 7A-7B shows exemplary results of an implementation of the method of FIG. 6A-6B.

Reference is now made to FIG. 7A which is an exemplary result of an implementation of the method of FIGS. 6A-6B. Three blocks are shown: a bedroom block 700A, a closet block 702A, and a battlefield block 704A. Bedroom block 700A includes requests for four images: bed, table, sword and helmet; closet block 702A includes requests for four images: cloak, armor, helmet and sword; and battlefield block 704A includes requests for four images: horse, sword, dragon, and helmet. Prior the implementation of the method of FIG. 6A, if a request for the sword image is intercepted, any subsequent rules for retrieving any of the other images in blocks 700A, 702A, and 704A are disabled to avoid retrieving data that are not required by the application. However, upon implementing the method of FIG. 6A, four blocks are shown, each of which are comprised of unique requests: bedroom block 700B includes requests for the bed and table images, closet block 702B includes requests for the cloak and armor images, battlefield block 704B includes requests for the horse and dragon images, and a new accessories block 706 includes requests for the sword and helmet images, which were the requests common to blocks 700A, 702A, and 704A. Upon intercepting a request for the sword, a rule to download accessories block 706 is activated and the helmet is retrieved. It may be noted that a flag can be set to determine the order of the requests in accessories block 706, such as a random order, or an average order. For example, if the flag is set to the average order, accessories block 706 will first request the sword image, and then the helmet image. Alternatively, if the flag is set to order according to the highest priority, since closet block 702A has a higher priority than either bedroom block 700A or battlefield block 704A, accessories block 706 first requests the helmet image and then the sword image, in accordance with the order of the requests in closet block 702A. As another example, two sets, A and B, comprising requests for data within specified ranges are shown, where some requests have attributes associated with them.

| Set A | Set B |
|---|---|
| 100,000 -> 125,000 | 190,000 -> 210,000 (attribute X attached) |
| 75,000 -> 95,000 | 77,000 -> 80,000 |
| 200,000 -> 3,000,000 | 110,000 -> 115,000 |
| 0 -> 1025 | 4,000,000 -> 5,000,000 |
| | 0 -> 1025 |

Upon applying the method of FIG. 6A, sets A and B are compared, and requests for common data ranges are extracted, resulting in three sets: a new set AB comprising requests that are common to both sets A and B, a set A' comprising requests that are unique to A, and a set B' comprising requests that are unique to B. In the above example, set A includes a request for range 100,000 to 125,000, and set B includes a request for range 110,000 to 115,000. Although the two requests are not identical, the request from set B is a subset of the request from set A, and thus, common to both A and B. The request is extracted from set B, and only the portion of the request that is common to both A and B is extracted from set A, resulting in the addition of the common request 110,000→115,000 to set AB. Two smaller requests are added to set A' for ranges that are unique to A: 100,000→100,000 and 115,000→125,000. As another example, set A includes a request for range 200,000→3,000,000, and set B includes a request for range 190,000→210,000. Upon applying the method of FIG. 6A, the portion of the non-matching requests that is common to both sets A and B, 200,000→210,000, is extracted from both sets and added to set AB, a request for the remaining data that are unique to set A, 210,000→3,000,000, is added to set A', and a request for the remaining data that are unique to set B, 190,000→200,000, are added to set a B'. The requests in sets A and B are preferably compared and matched without regard to the order in which they appear. The order of the requests in the new set AB is preferably determined in accordance with one or more predefined parameters.

| Set AB |
| --- |
| 110,000 -> 115,000 (order rank 1 based on Set A) |
| 200,000 -> 210,000 (order rank 1 based on Set B) -- (attribute X still attached) |
| 77,000 -> 80,000 (order rank 2 from both Sets A and B) |
| 0 -> 1025 (order rank 4 from Set A) |

| Set A' comprising requests unique to A | Set B' comprising requests unique to B |
| --- | --- |
| 100,000 → 110,000 | 190,000 → 200,000 |
| 115,000 → 125,000 | 4,000,000 → 5,000,000 |
| 75,000 → 77,000 | |
| 80,000 → 95,000 | |
| 210,000 → 3,000,000 | |

Figure 7B:
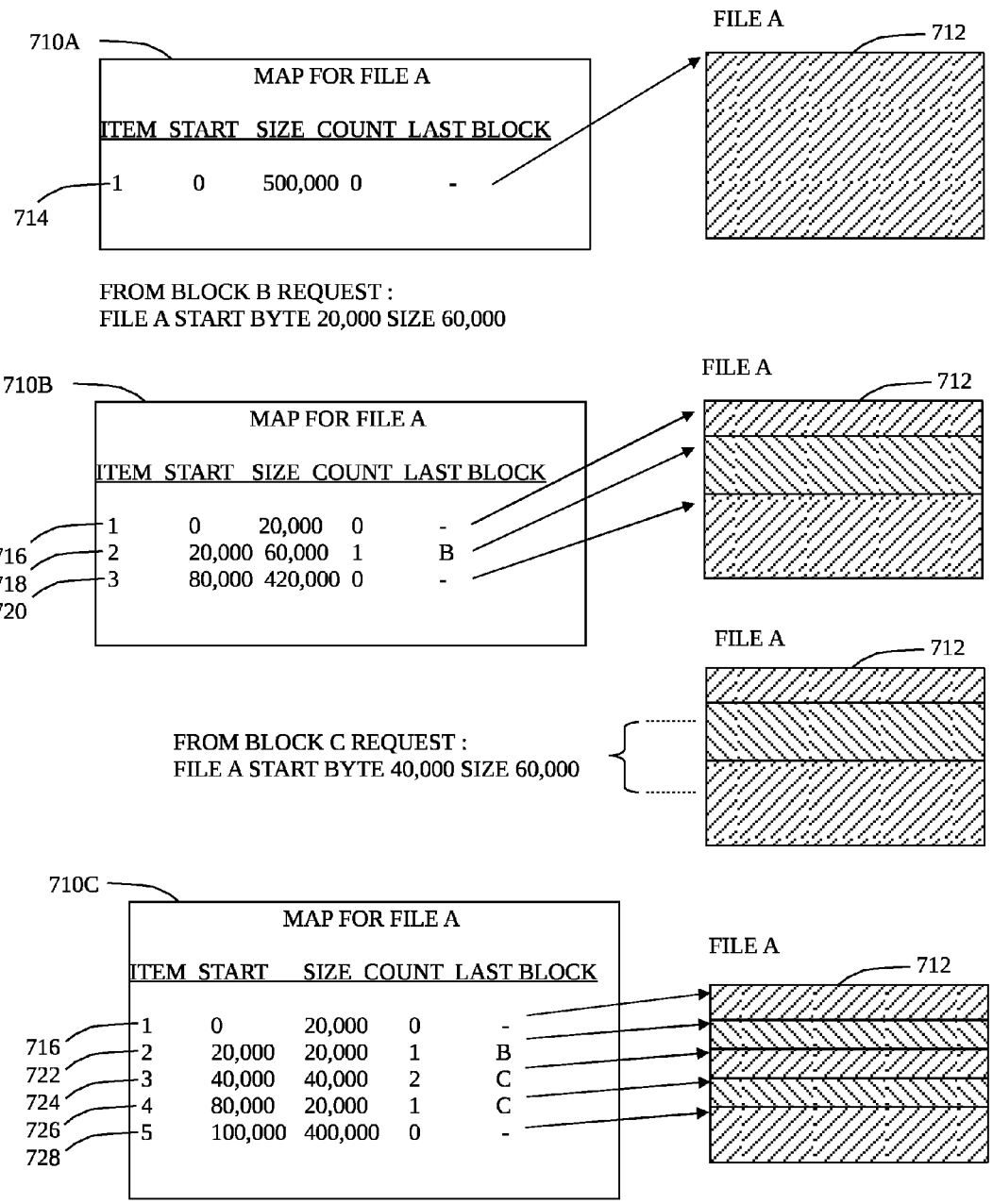

Reference is now made to FIG. 7B which is another exemplary result of an implementation of the method of FIGS. 6A-6B. A file map 710A is shown for a file 712. Prior to mapping any requests for file 712, map 710A includes a single item 714, starting from the beginning of the file at byte 0, and spanning the size of the entire file of 500,000 bytes. A first request is obtained from block B for 60,000 bytes starting from byte 20,000 from File A 712. As shown in file map 710B, item 714 is split according to the method described in FIGS. 6A-6B, into three sections, a first item 716 starting from byte 0 of size 20,000, a second item 718 starting from byte 20,000 for 60,000 bytes and corresponding to the request, and a third item 720 starting from byte 80,000 of size 420,000. Item 718 is mapped to the first request, it's count is incremented by one, and the last block field is set to Block B which is the last block that requested that data. A second request is obtained from block C for 60,000 bytes starting from byte 40,000. This request partially overlaps both items 718 and 720 in file map 710B. As shown in file map 710C, since item 718 includes the start byte of the second request, item 718 is split into two items: item 722 starting from byte 20,000 of size 20,000 and maintaining the previous count and last-block attributes, and item 724 starting from byte 40,000 of size 40,000 which is mapped to the second request, where the indices of the items are updated, accordingly. Thus the count of item 724 is incremented and now has a value of 2, and the last block attribute is set to block C. However, the request extends beyond item 724, and thus, the request is split into two portions, where the first portion of the request maps onto item 724, and the second portion of the request has a start byte of 80,000 and a size of 20,000, and thus maps onto item 720 in map 710B, and which also has a start byte 80,000. Since item 720 is larger than the second request portion, item 720 is split into items 726 and 728 in map 710C, where item 726 is mapped onto the second request portion and thus its count is incremented and its last block attribute is set to block C. Item 748 maps onto the remaining portion of the file. Thus by examining the file map, it is possible to determine if, and how many times a portion of a file has been referenced. By examining the count and last block attributes in map 730, the file can be divided into three portions: a portion that is unique to block B and that includes map items with a count of 1 and a last block of B, and starting from byte 20,000 with a size of 20,000 bytes; a portion that is common to both blocks B and C with a count of 2 which is equivalent to the number of input blocks, and starting from byte 40,000 with a size of 40,000 bytes; and a portion that is unique to block C with a count of 1 and a last block of C, starting from byte 80,0000 for 20,000 bytes.

As another example, the method described in FIGS. 6A-6B may be applied to network, or traffic analysis. Multiple routes traveled over path segments are recorded, and the number of traversals, or travel frequency, over each path segment is tallied. Segments are scored in accordance with their tally. For example, a frequently traveled path segment receives a high score and rarely traveled segment receives a low score. The tally system can be used in conjunction with the method of FIG. 6A as follows: path segments with a tally of one are unique and are not extracted from the sets, path segments with a tally that is greater than one are extracted. If the tally of the extracted element is equal to the number of sets, then the extracted path segment is common to all the routes, and is added to the overlap set. This could be applied to a road traffic scenario, where road segments that are frequently traveled, and therefore have a high score are identified as requiring higher traffic enforcement, or alternatively, a higher commercial value.

Figure 8:
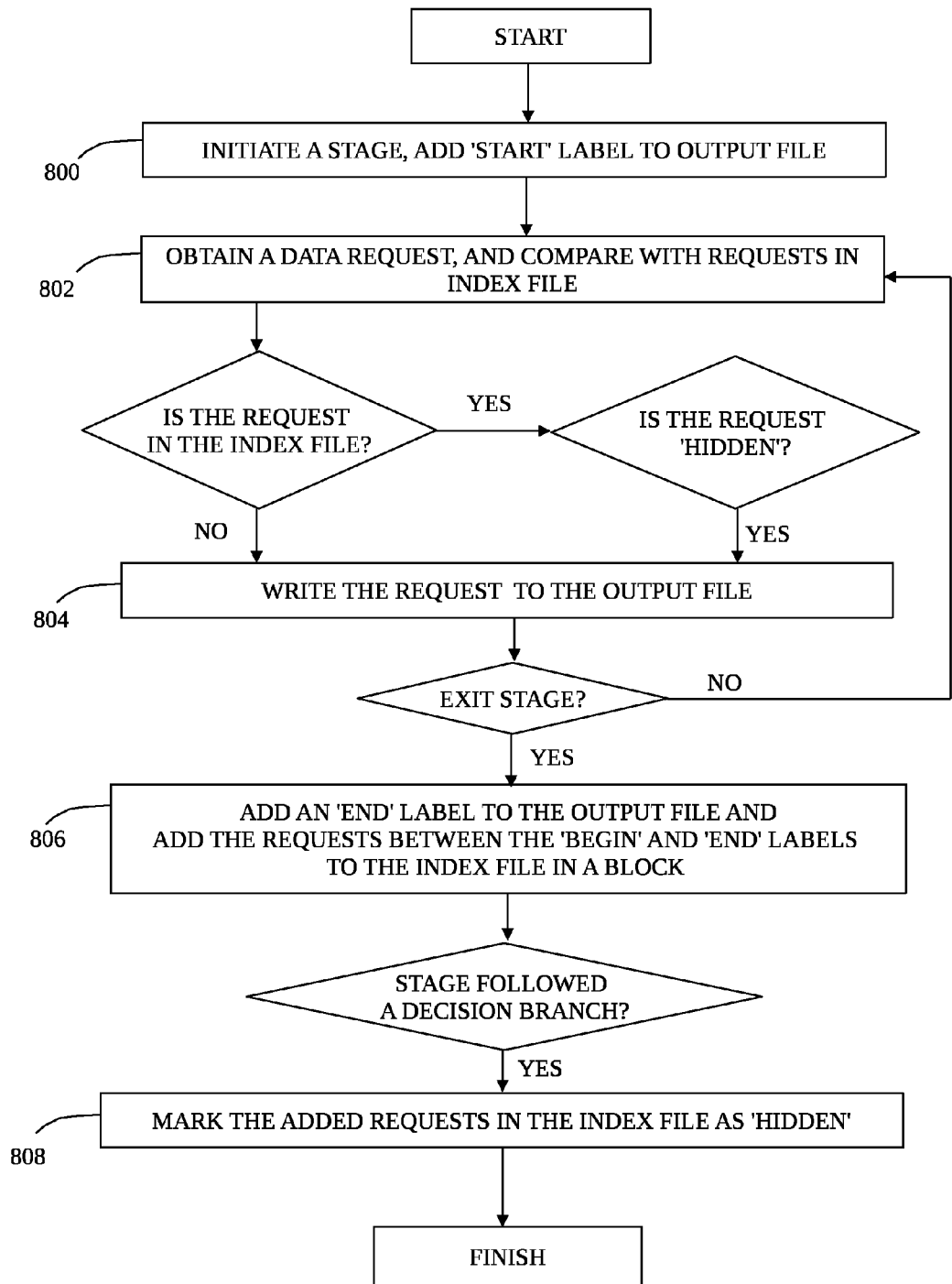
FIG. 8 is a simplified flowchart illustration of an exemplary method of operation of the system of FIG. 5 relating to defining blocks, operative in accordance with an embodiment of the invention.

Reference is now made to FIG. 8 which is a simplified flowchart illustration of an exemplary method of operation of the system of FIG. 5 relating to defining blocks, operative in accordance with an embodiment of the invention. The method of FIG. 8 may be employed for defining blocks for inclusion in an index file. Since the software application is decision-oriented, each instantiation of the software application typically results in a different sequence of data requests, resulting in a different sequence for placing the blocks defined in the index file on the priority queue. For example, in a first instantiation, a user descends down a main hallway and chooses to enter a room A which includes images of a portrait and a cabinet, resulting in requests for blocks for displaying the main hallway and room A. Whereas in a second instantiation, the user descends down the main hallway and chooses to enter a room B which includes images for a table and the same cabinet, and which results in requests for blocks for displaying the main hallway and room B. However, to avoid requesting data that has already been retrieved, data requests are typically not included in more than one block. In the above example, if room A is selected in the first instantiation, the request for the cabinet is included in the block defined for room A in the index file, and therefore, the cabinet is not included in a block defined in the index file for room B, which is selected in a second instantiation, resulting in an insufficient block definition for displaying room B. This problem is solved by adding a 'hidden' tag to requests that are associated with a decision branch in the application.

Thus the method of FIG. 8 may be used to define blocks in the index file in a manner that enables requesting data that are required for a particular instantiation of the application, while averting requesting data that are unnecessary for that instantiation. The application is preferably executed in a mode that enables defining blocks during execution, such as by recording requests for data in an output file, and by adding labels to the output file via a user interface, such as by pressing an F-key. Upon initiating a stage in the application, a START STAGE tag is added to an output file via the user interface (Step 800). Upon obtaining a data request, the request is compared with previously intercepted data requests that have already been included in the index file (Step 802). If the new request is not present in the index file or the request is present in the index file but is marked as 'hidden', the request is written to the output file (Step 804). This process is repeated until the end of the stage, whereupon an END STAGE tag is added to the output file via the user interface. The requests in the output file that fall between the START STAGE and END STAGE tags are added to the index file in a block that is associated with the stage (Step 806). If the stage was initiated following a decision branch in the execution flow of the application, such as if the user selected to enter one of two rooms, any requests included the block that was added to the index file are marked as 'hidden' (Step 808). This method is preferably repeated for all possible stages and all possible decision branches in the decision-oriented application. In the above example, if room A is selected in a first instantiation, the portrait and cabinet requests are included in the block for room A. In a second instantiation where the user selects to enter room B, without the 'hidden' tag, these requests would be omitted in a block definition for room B, even if those data are required for displaying room B. Thus, by using the 'hidden' tag in the index file, blocks are defined for parallel logical paths in the application, and required data is requested, while non-required data is not requested.

Figure 9A:
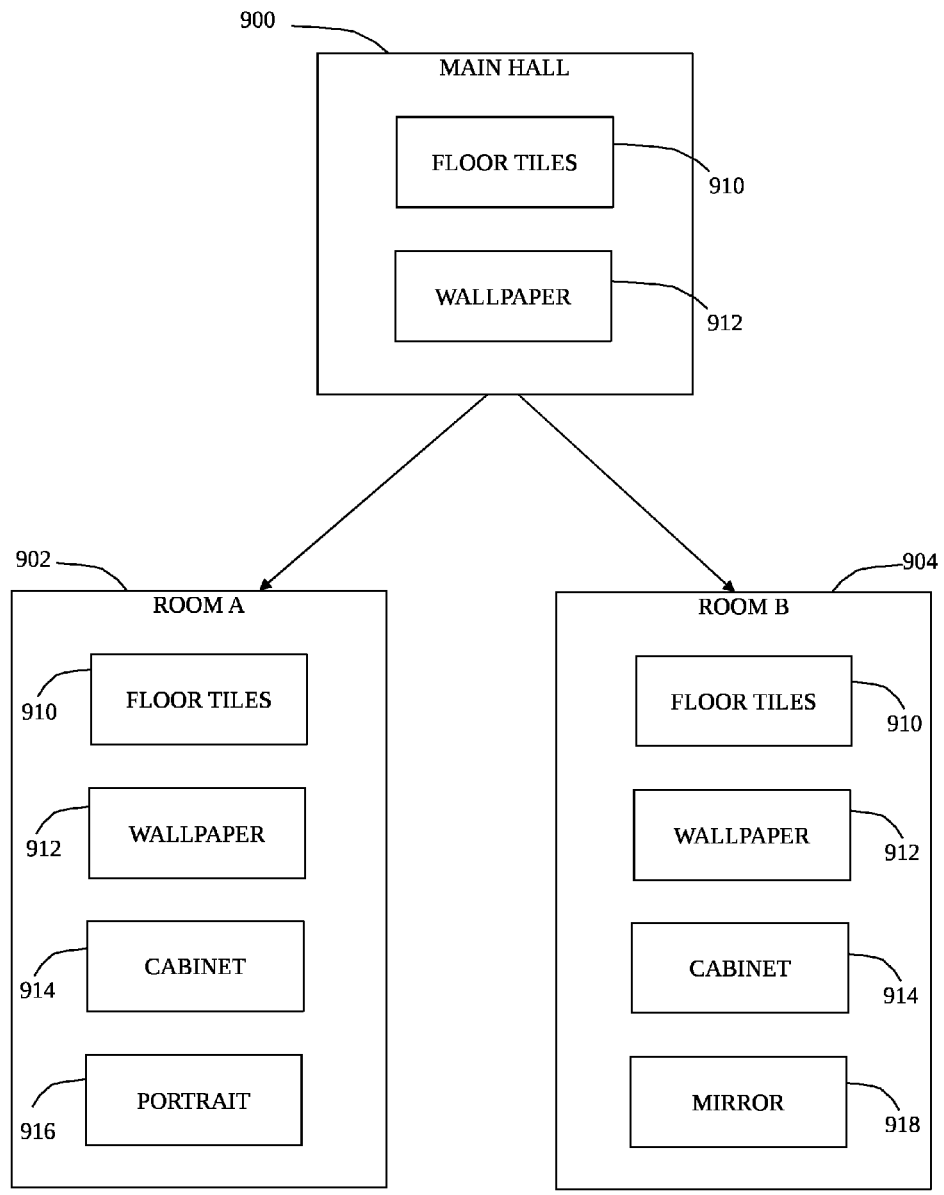
FIGS. 9A-9B show exemplary results of an implementation of the method of FIG. 8.
Figure 9B:
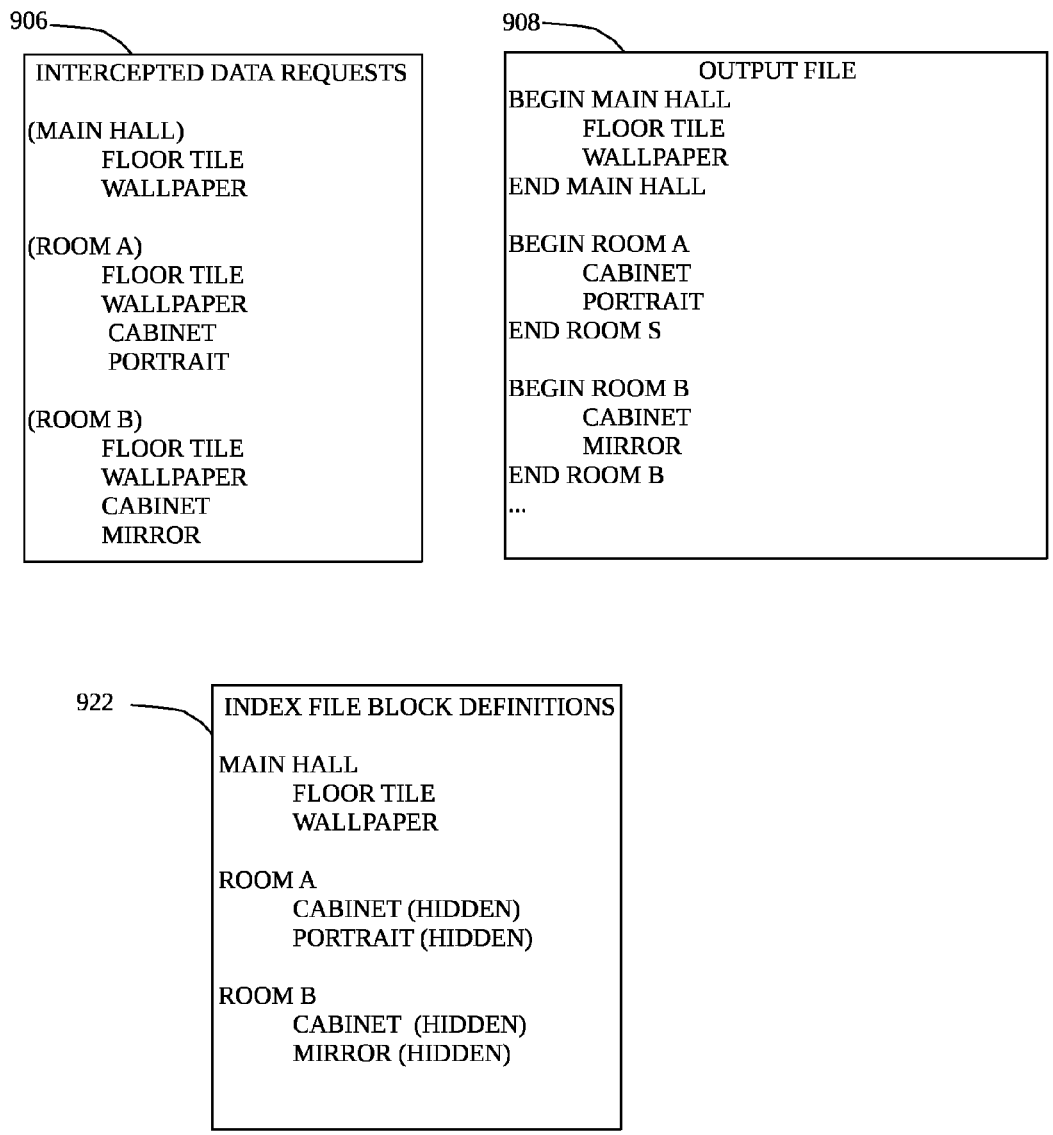

Reference is now made to FIGS. 9A-9B, which, taken together, illustrate exemplary results of an implementation of the method of FIG. 6B. FIG. 9A shows a sequence of data requirements for a decision point in the application, where a main hall stage 900 can lead to either of two branches, room A 902, or room B 904. FIG. 9B shows the intercepted data requests 906 resulting from an execution of the application, an output file 908 for recording intercepted requests, and the index file 922 resulting from an application of the method of FIG. 8. An operator defining index file 922 executes the application and progresses down a required stage in the game, such as main hall stage 900 which displays data referenced by floor tiles block 910 and wall paper block 912. The intercepted data requests 906, shown in FIG. 9B, are compared with requests from the index file 922. Since index file 922 does not yet include the floor tile block 910 or wall paper block 912, the requests are recorded in an output file 908, shown in FIG. 9B, between the labels 'Begin Main Hall' and 'End Main Hall'. The requests between the labels are retrieved from output file 908, grouped into a Floor Tile block and Wall Paper block, which are added to index file 922 in association with the Main Hall stage of the game. Referring back to FIG. 9A, the game presents the operator with a choice: progress to room A 902 or to room B 904. The operator selects room A 902, which includes data referenced by floor tiles 910 and wall paper 912 that were displayed in the main hall, and additionally, data referenced by cabinet block 914 and portrait block 916. The operator preferably presses an F-key, adding a label 'begin room A' to output file 908. Since index file 922 already includes block definitions for floor tiles 910 and wall paper 912 and they are not hidden, only requests for cabinet block 914 and portrait block 916 are recorded in output file 908. Upon exiting room A 902, the operator preferably presses the F-key, adding the label 'end room A' to output file 908. The operator identifies the data requests located between labels 'begin room A' and 'end room A' in output file 908, and adds cabinet block 914 and portrait block 916 definitions to index file 922 in association with room A. Additionally, since entering room A resulted from a decision made by the user playing the game, a 'hidden' label is added to both the cabinet block 914 and portrait block 916 definitions for room A in index file 922. The operator continues playing the game and selects to enter room B 904, which displays data referenced by floor tiles block 910, wall paper block 912, cabinet block 914 as well as a mirror block 918. The operator preferably selects the F-key, adding a label 'begin room B' to output file 908. As described above for room A, floor tiles block 910 and wall paper block 912 appear in index file 922, and are therefore not recorded in output file 908. Similarly, since mirror block 918 does not appear in index file 922, these requests are recorded in output file 908. However, although requests for cabinet 914 are present in index file 922, they are labeled as 'hidden', and therefore they are also recorded, a second time, in output file 908. Upon exiting room B, the operator preferably presses the F-key, adding the label 'end room B' to output file 908. The operator identifies the data requests located between labels 'begin room B' and 'end room B' in output file 908, and adds cabinet block 914 and mirror block 918 to index file 922 in association with room B. Thus, a user playing the game with index file 922 downloads floor tiles block 910 and wallpaper block 912 upon entering the main hall. Upon selecting the room A, cabinet block 914 and portrait block 916 are downloaded. Alternatively, if room B is selected, cabinet block 914 and mirror block 918 are downloaded.

Figure 10A:
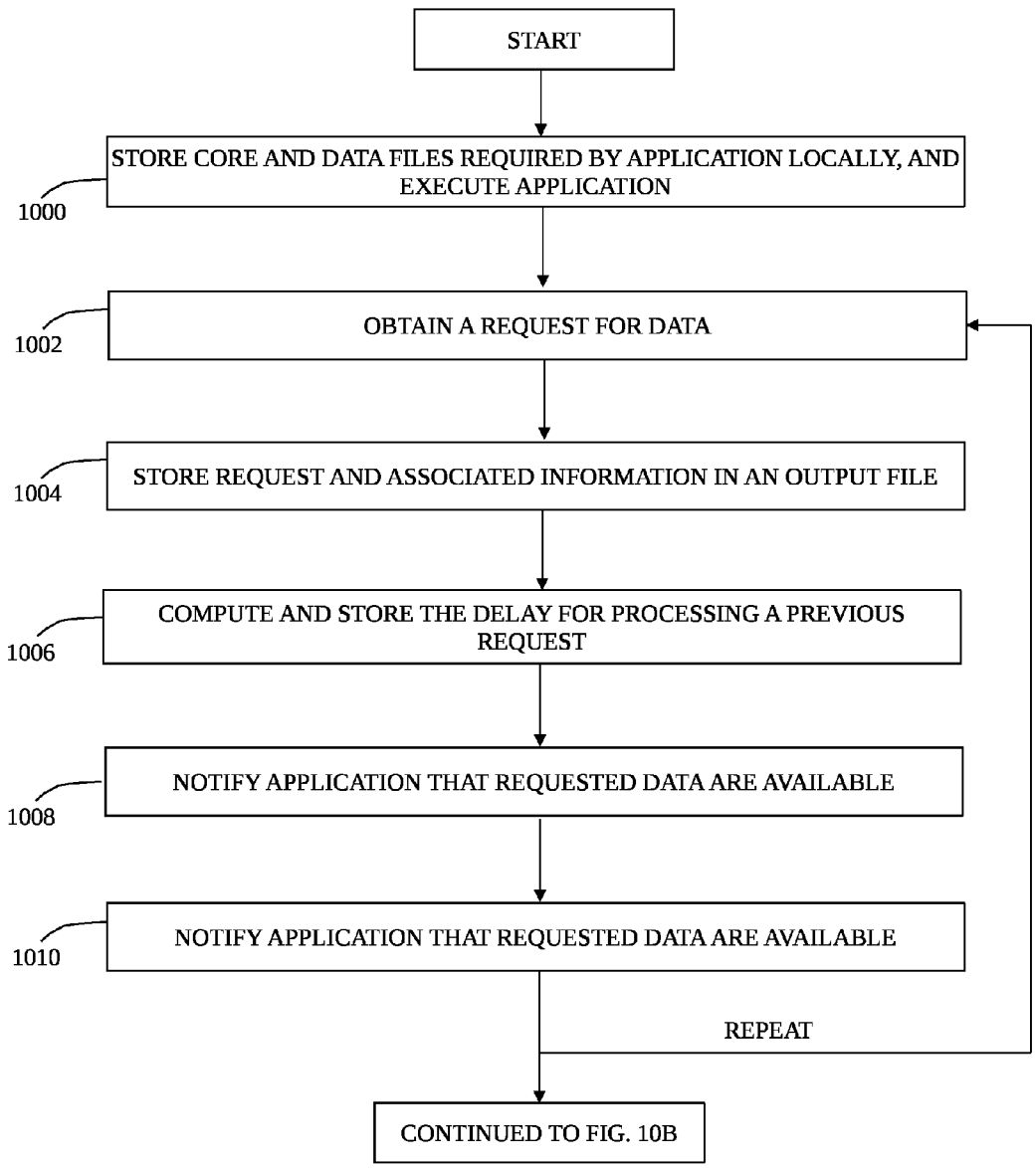
FIG. 10A is a simplified flowchart illustration of an exemplary method of operation of the system of FIG. 5 relating to evaluating a candidate index file, operative in accordance with an embodiment of the invention.

Reference is now made to FIG. 10A which is a simplified flowchart illustration of an exemplary method of operation of the system of FIG. 5 relating to evaluating a candidate index file, operative in accordance with an embodiment of the invention. In the method of FIG. 10A, a simulation file is created for an execution of the application as follows. The application, including the core and data files, is installed locally, and the application is executed (Step 1000), such as in accordance with an index file. A request for data by the application is obtained (Step 1002), and information that is associated with the obtained request, such as the filename, start address, the size of the request, and the time that the request is obtained are stored in the simulation file (Step 1004). The delay between responding to a previously obtained request and obtaining the current request is calculated, such as in milliseconds, using information obtained from the simulation file in association with the previous request, and the delay is stored in the simulation file in association with the previously obtained request (Step 1006). For example, if a response to the previously obtained request is given at time T1, and the currently obtained request is received at time T2, the delay is computed as T2-T1. The requested data is sent to the application, such as by notifying the application that the data are available (Step 1008) and the time for completing the processing of the obtained request is recorded in the simulation file (Step 1010). Steps 1002 to 1010 are preferably repeated until the application terminates, and the method resumes in accordance with FIG. 10B.

Figure 10B:
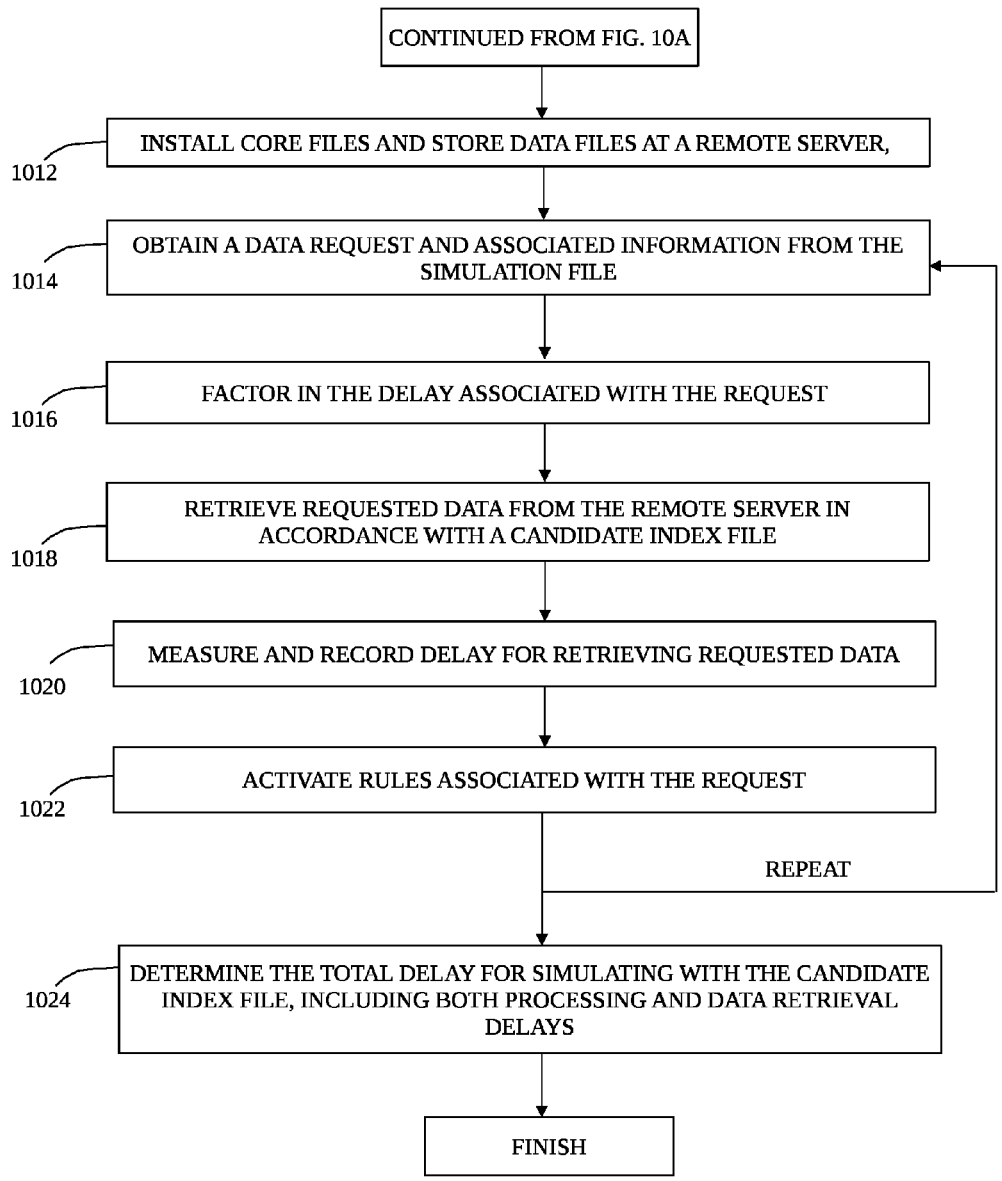
FIG. 10B is a simplified flowchart illustration of an exemplary method of operation of the system of FIG. 5 relating to evaluating a candidate index file, operative in accordance with an embodiment of the invention.

Reference is now made to FIG. 10B which is a simplified flowchart illustration of an exemplary method of operation of the system of FIG. 5 relating to evaluating a candidate index file, operative in accordance with an embodiment of the invention. In the method of FIG. 10B, a simulation of the application is executed in a manner to preferably maintain a constant delay for processing requests in accordance with the simulation file created by the method of FIG. 10A and measure the delay for retrieving the requested data from a remote storage device in accordance with a candidate index file, where the candidate index file may be the index file of method of FIG. 10A, a modification of the index file of FIG. 10A, or any other index file obtained using any conventional method. The core files are installed locally, and the data files are stored remotely (Step 1012). A request for data is preferably obtained, such as from the simulation file, as well as any information that is associated with the request, such as the recorded delay for processing the request (Step 1014). The processing delay is factored, such as by waiting for the duration of the delay that was obtained with the request in Step 1014 (Step 1016). The requested data is retrieved in accordance with the block definitions, rules, and any additional attributes defined in the candidate index file (Step 1018). The delay for retrieving the requested data from the remote storage device is measured and recorded (Step 1020). Any rules associated with the requested data are activated (Step 1022), such as rules that place additional blocks on the priority queue, or that change a priority for a block that is on the queue. Step 1014-1022 are preferably repeated for the all the requests recorded in the simulation file. The total delay for simulating the application with the candidate index file is determined, where the total delay preferably includes the processing delays obtained from the simulation file in association with the requests, as well as the delays for retrieving data from the remote server in accordance with the obtained requests (Step 1024). This method is preferably repeated for any number of candidate index files. In this manner, one or more candidate index files are preferably modified, and the effect of the modification on the delay for retrieving data from a remote storage device in accordance with a first candidate index file is measured and compared with a similar delay for retrieving the same data in accordance with a second candidate index files, where the delay for processing the requested data is preferably constant for the two different candidate index files.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for evaluating candidate data retrieval plans, the method comprising:
 a) traversing a log to identify within the log requests for data made by a computer software application, wherein the log was compiled during an execution of the computer software application to record the requests for data, and wherein the traversing is performed at a time other than during execution of the computer software application;
 b) retrieving data responsive to any of the requests for data identified within the log, wherein the retrieving is performed in accordance with a data retrieval plan that is associated with the data that are the subject of the request for data, and wherein the retrieving is performed at a time other than during execution of the computer software application; and
 c) determining a total delay associated with the data retrieval plan based on processing delays stored in the log and delays associated with retrieving the data.

2. The method of claim 1 wherein the requests for data made by the computer software application were made with respect to locally stored data, whereas the retrieving is performed with respect to remotely stored data.

3. The method of claim 1 and further comprising:
 d) creating a plurality of different versions of the data retrieval plan;
 e) performing steps a) through c) separately for each of the data retrieval plans; and
 f) comparing the total delays of any of the data retrieval plans.

4. The method of claim 1 wherein the retrieving further comprises retrieving wherein the data retrieval plan includes one or more requests for data, and wherein the requests of the data retrieval plan are associated with one or more rules.

5. A computer program product for evaluating candidate data retrieval plans, the computer program product comprising:
 a non-transitory, computer-readable storage medium; and
 computer-readable program code embodied in the computer-readable storage medium, wherein the computer-readable program code is configured to
 a) traverse a log to identify within the log requests for data made by a computer software application, wherein the log was compiled during an execution of the computer software application to record the requests for data, and wherein the traversing is performed at a time other than during execution of the computer software application,
 b) retrieve data responsive to any of the requests for data identified within the log, wherein the retrieving is performed in accordance with a data retrieval plan that is associated with the data that are the subject of the request for data, and wherein the retrieving is performed at a time other than during execution of the computer software application, and c) determine a total delay associated with the data retrieval plan based on processing delays stored in the log and delays associated with retrieving the data.

6. The computer program product of claim 5 wherein the requests for data made by the computer software application were made with respect to locally stored data, whereas the retrieving is performed with respect to remotely stored data.

7. The computer program product of claim 5 wherein the computer-readable program code is configured to
   d) create a plurality of different versions of the data retrieval plan,
   e) perform a) through c) separately for each of the data retrieval plans, and
   f) compare the total delays of any of the data retrieval plans.

8. The computer program product of claim 5 wherein the data retrieval plan includes one or more requests for data, and wherein the requests of the data retrieval plan are associated with one or more rules.

\* \* \* \* \*